(12) United States Patent
Kondo et al.

(10) Patent No.: US 7,012,651 B2
(45) Date of Patent: Mar. 14, 2006

(54) VIDEO SIGNAL PROCESSING METHOD AND APPARATUS

(75) Inventors: Satoshi Kondo, Yawata (JP); Tetsuya Itani, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 511 days.

(21) Appl. No.: 10/079,465

(22) Filed: Feb. 22, 2002

(65) Prior Publication Data
US 2002/0113900 A1    Aug. 22, 2002

(30) Foreign Application Priority Data
Feb. 22, 2001  (JP) ............................. 2001-045972

(51) Int. Cl.
*H04N 5/21* (2006.01)
(52) U.S. Cl. ................................. 348/624
(58) Field of Classification Search ............... 348/624, 348/607, 611, 622, 627, 712; 386/9, 33
See application file for complete search history.

(56) References Cited

U.S. PATENT DOCUMENTS

| 5,155,582 A | * | 10/1992 | Tokoi et al. ............. 348/663 |
| 5,161,020 A | * | 11/1992 | Sugimori et al. ........... 348/563 |
| 5,473,389 A | * | 12/1995 | Eto et al. .................. 348/669 |
| 5,491,522 A | * | 2/1996 | Hong ......................... 348/663 |
| 5,640,211 A | * | 6/1997 | Kawano et al. ............ 348/663 |
| 5,673,355 A | * | 9/1997 | Strolle et al. ................. 386/9 |
| 5,805,238 A | * | 9/1998 | Raby et al. ................ 348/609 |
| 6,163,346 A | * | 12/2000 | Tsyrganovich ............. 348/607 |
| 6,246,827 B1 | * | 6/2001 | Strolle et al. ................ 386/33 |
| 6,424,384 B1 | * | 7/2002 | Tsyrganovich ............. 348/666 |

FOREIGN PATENT DOCUMENTS

| DE | 002821183 B1 | * | 5/1978 |
| EP | 000606784 A1 | * | 1/1993 |
| JP | 4-17485 | | 1/1992 |
| JP | 6-105322 | | 4/1994 |

* cited by examiner

*Primary Examiner*—Paulos M. Natnael
(74) *Attorney, Agent, or Firm*—Wenderoth, Lind & Ponack, L.L.P.

(57) ABSTRACT

A video signal processing method and apparatus eliminates dot crawls and cross color interferences from a component video signal that has been subjected to Y/C separation. Components at a horizontal frequency of 3.58 MHz and a temporal frequency of 15 Hz are extracted from luminance signal data using a horizontal filter and a time filter. When the absolute value of the component value is equal to or larger than a predetermined value, an output of the horizontal filter is subtracted from the luminance signal data by a subtracter, thereby eliminating dot crawls.

18 Claims, 19 Drawing Sheets

VIDEO SIGNAL PROCESSING METHOD AND APPARATUS

FIELD OF THE INVENTION

The present invention relates to a video signal processing method and apparatus for eliminating dot crawls or cross color interferences from a component video signal after being subjected to Y/C separation.

BACKGROUND OF THE INVENTION

When the Y/C separation is performed for a composite video signal, harmful influences such as dot crawls (which are also called "cross luminance interferences") and cross color interferences occur. The Y/C separation is classified broadly in three types, and these three types of separation are referred to as one-dimensional Y/C separation, two-dimensional Y/C separation, and three-dimensional Y/C separation, respectively. Here, three-dimensional frequency characteristics of two-dimensional Y/C separation are shown in FIG. 17, as an example. FIG. 17 represents an NTSC signal in three-dimensional frequency space. In FIG. 17, a large rectangular parallelepiped 1001 in the center represents the band of the luminance signal, and hatched small rectangular parallelepipeds 1002 represent the bands of the color-difference signals. Further, rectangular parallelepipeds 1005 shown by dotted lines represent frequency bands extracted by a two-dimensional Y/C separation filter as the color-difference signal. It can be seen from FIG. 17 that when the color-difference signals have high frequency components in the vertical direction, higher frequency components of the color-difference signals that belong to the bands of the rectangular parallelepipeds 1002 and that lie off the rectangular parallelepipeds 1005 remain as luminance signal components. These frequency components of the color-difference signals that remain as the luminance signal at the Y/C separation cause dot crawls.

As a prior art video signal processing apparatus for reducing these harmful effects, a video signal processing apparatus that reduces the dot crawls is disclosed in Japanese Published Patent Application No. Hei.4-17485 (hereinafter, referred to as Reference No.1). In this video signal processing apparatus, saturation levels of color-difference signals are detected, and notch filtering is performed for a luminance signal according to the detected saturation levels, thereby reducing the dot crawls.

Further, as an apparatus for reducing cross color interferences, there is an apparatus that reduces cross color interferences of a carrier color signal, disclosed in Japanese Published Patent Application No. Hei.6-105322 (hereinafter, referred to as Reference No.2). This cross color reduction apparatus detects whether a carrier color signal of the present field and a carrier color signal of the immediately preceding field are not in inverted phases, and attenuates the present carrier color signal according to the detection result, thereby reducing the cross color interferences.

Further, as noises of the video signal, in addition to dot crawls and cross color interferences, there are time axis noises which are minute-level noises occurring at random in the temporal direction. As a prior art method for eliminating these time axis noises, there is, for example, a method described in "Multi-dimensional TV signal processing of TV pictures" (by Takahiko Fukinuki, published by Nikkan Kogyo Shimbun Ltd., pp.190–191).

The apparatus disclosed in Reference No.1 detects dot crawls using the saturation levels of color-difference signals.

However, the dot crawls result, in cases where original color-difference signals have higher frequency components in the horizontal or vertical direction, from the higher frequency components of the color-difference signals remaining in the luminance signal after the two-dimensional or three-dimensional Y/C separation. Thus, dot crawls do not always occur in areas where the saturation levels of the color-difference signals are high. Therefore, in some cases, the apparatus that is disclosed in Reference No.1 cannot reduce dot crawls.

The apparatus disclosed in Reference No.2 compares the phases of a carrier color signal of the present field and a carrier color signal of the immediately preceding field, thereby detecting cross color interferences. However, for component video signals having demodulated color-difference signals, the method by which the phases of the carrier color signal of the present field and the carrier color signal of the immediately preceding field are compared with each other to detect cross color interferences, cannot be used. Therefore, the apparatus that is disclosed in Reference No.2 cannot reduce cross color interferences in component video signals after Y/C separation.

SUMMARY OF THE INVENTION

The present invention has for its object to provide a video signal processing method and apparatus, which can effectively eliminate dot crawls and cross color interferences from a component video signal that has been subjected to Y/C separation.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a video signal processing method comprising steps of: extracting a first predetermined frequency component in three-dimensional frequency space, from a luminance signal of a component video signal; and eliminating a second predetermined frequency component from the luminance signal, according to the first predetermined frequency component value. Therefore, dot crawls superimposed upon luminance signal components of a component video signal that has been subjected to Y/C separation can be effectively eliminated.

According to a 2nd aspect of the present invention, in the video signal processing method of the 1st aspect, the first predetermined frequency component is extracted by filtering the luminance signal in a horizontal direction with a filter having a pass-band of 3.58 MHz, and further filtering the signal in a temporal direction with a filter having a pass-band of 15 Hz. Therefore, pixels in which dot crawls occur can be specified, whereby dot crawls superimposed upon luminance signal components of a component video signal that has been subjected to Y/C separation can be effectively eliminated.

According to a 3rd aspect of the present invention, in the video signal processing method of the 1st aspect, the second predetermined frequency component is obtained by filtering the luminance signal in a horizontal direction with a filter having a pass-band of 3.58 MHz. Therefore, dot crawls can be greatly reduced, and dot crawls superimposed upon luminance signal components of a component video signal that has been subjected to Y/C separation can be effectively eliminated.

According to a 4th aspect of the present invention, in the video signal processing method of the 1st aspect, the second predetermined frequency component is obtained by filtering the luminance signal in a horizontal direction with a filter having a pass-band of 3.58 MHz, and further filtering the signal in a temporal direction with a filter having a pass-band of 15 Hz. Therefore, dot crawls can be greatly reduced, and dot crawls superimposed upon luminance signal components of a component video signal that has been subjected to Y/C separation can be effectively eliminated.

According to a 5th aspect of the present invention, there is provided a video signal processing apparatus comprising: a horizontal filter for receiving luminance signal components of a component video signal and filtering the same in a horizontal direction; a time filter for filtering an output of the horizontal filter in a temporal direction; a comparator for deciding whether an output of the time filter is equal to or larger than a predetermined threshold; a gain adjuster for receiving the output of the horizontal filter, changing gain of the output of the horizontal filter according to a result of the comparator, and outputting an obtained result; and a subtracter for subtracting an output of the gain adjuster from the luminance signal components. Therefore, dot crawls superimposed upon luminance signal components of a component video signal that has been subjected to Y/C separation can be effectively eliminated with a simple structure.

According to a 6th aspect of the present invention, there is provided a video signal processing apparatus comprising: a filter for receiving luminance signal components of a component video signal and filtering the same in a horizontal direction and in a temporal direction; a comparator for deciding whether an output of the filter is equal to or larger than a predetermined threshold; a gain adjuster for receiving the output of the filter, changing gain of the output of the filter according to a result of the comparator, and outputting an obtained result; and a subtracter for subtracting an output of the gain adjuster from the luminance signal components. Therefore, dot crawls superimposed upon luminance signal components of a component video signal that has been subjected to Y/C separation can be effectively eliminated with a simple structure.

According to a 7th aspect of the present invention, in the video signal processing apparatus of the 5th aspect, the horizontal filter is a band-pass filter having a pass-band of 3.58 MHz, and the time filter is a high-pass filter having a pass-band of 15 Hz. Therefore, pixels in which dot crawls occur can be specified, whereby dot crawls superimposed upon luminance signal components of a component video signal that has been subjected to Y/C separation can be effectively eliminated with a simple structure.

According to an 8th aspect of the present invention, in the video signal processing apparatus of the 6th aspect, the filter is a filter having a horizontal pass-band of 3.58 MHz and a temporal pass-band of 15 Hz. Therefore, pixels in which dot crawls occur can be specified, whereby the dot crawls superimposed upon luminance signal components of a component video signal that has been subjected to Y/C separation can be effectively eliminated with a simple structure.

According to a 9th aspect of the present invention, there is provided a video signal processing method comprising steps of: extracting a first frequency component from luminance signal components of a component video signal; obtaining a difference value of the luminance signal components between the present frame and an immediately preceding frame; obtaining a difference value of color-difference signal components of the component video signal between the present frame and the immediately preceding frame; and subtracting one-half of the difference value of the color-difference signal components between the present frame and the immediately preceding frame from the color-difference signal components, or replacing the color-difference signal components with an average value of the present frame and the immediately preceding frame, when the first frequency component value of the luminance signal components is equal to or larger than a first predetermined value, the difference value of the luminance signal components between the present frame and the immediately preceding frame is equal to or smaller than a second predetermined value, and the absolute value of the difference value of the color-difference signal components between the present frame and the immediately preceding frame is equal to or larger than a third predetermined value. Therefore, cross color interferences can be effectively eliminated from a component video signal having demodulated color-difference signals.

According to a 10th aspect of the present invention, there is provided a video signal processing method comprising steps of: extracting a first frequency component from luminance signal components of a component video signal; obtaining a difference value of the luminance signal components between the present frame and an immediately preceding frame; obtaining a difference value of color-difference signal components of the component video signal between the present frame and the immediately preceding frame; obtaining a difference value of the color-difference signal components between the present frame and a frame that is two frames before; and subtracting one-half of the difference value of the color-difference signal components between the present frame and the immediately preceding frame from the color-difference signal components, or replacing the color-difference signal components with an average value of the present frame and the immediately preceding frame, when the first frequency component value of the luminance signal components is equal to or larger than a first predetermined value, the absolute value of the difference value of the luminance signal components between the present frame and the immediately preceding frame is equal to or smaller than a second predetermined value, the absolute value of the difference value of the color-difference signal components between the present frame and the immediately preceding frame is equal to or larger than a third predetermined value, and the absolute value of the difference value of the color-difference signal components between the present frame and a frame that is two frames before is equal to or smaller than a fourth predetermined value. Therefore, cross color interferences can be eliminated accurately and effectively from a component video signal having demodulated color-difference signals.

According to an 11th aspect of the present invention, in the video signal processing method of the 9th or 10th aspect, the first frequency component is extracted by filtering the luminance signal components with a horizontal band-pass filter having a pass band of 3.58 MHz. Therefore, pixels in which cross color interferences occur can be specified, whereby cross color interferences can be effectively eliminated from a component video signal having demodulated color-difference signals.

According to a 12th aspect of the present invention, there is provided a video signal processing apparatus comprising: a filter for receiving luminance signal components of a component video signal and extracting a first predetermined frequency component; a first frame memory for storing the luminance signal components for one frame period; a first subtracter for obtaining a difference value between the luminance signal components and an output of the first frame memory; a second frame memory for storing color-difference signal components of the component video signal for one frame period; a second subtracter for obtaining a difference value between the color-difference signal components and an output of the second frame memory; a noise detector for receiving an output of the filter, an output of the first subtracter and an output of the second subtracter, and detecting noises; a gain adjuster for receiving the output of the second subtracter, and changing gain of the output of the second subtracter according to a result of the detection by the noise detector; and a third subtracter for subtracting an output of the gain adjuster from the color-difference signal components. Therefore, cross color interferences can be effectively eliminated from a component video signal having demodulated color-difference signals.

According to a 13th aspect of the present invention, in the video signal processing apparatus of the 12th aspect, the filter is a horizontal band-pass filter having a pass-band of 3.58 MHz, and the noise detector decides that noises are detected, when the absolute value of the output of the filter is equal to or larger than a first predetermined value, the absolute value of the output of the first subtracter is equal to or smaller than a second predetermined value, and the absolute value of the output of the second subtracter is equal to or larger than a third predetermined value. Therefore, pixels in which cross color interferences occur can be specified, whereby the cross color interferences can be effectively eliminated from a component video signal having demodulated color-difference signals.

According to a 14th aspect of the present invention, in the video signal processing apparatus of the 12th aspect, the gain adjuster changes the gain of the output of the second subtracter to one-half when noises are detected by the noise detector, and changes the gain to 0 when no noise is detected by the noise detector. Therefore, cross color interferences can be effectively eliminated from a component video signal having demodulated color-difference signals.

According to a 15th aspect of the present invention, there is provided a video signal processing method by which dot crawls and time-axis noises are eliminated from luminance signal components of a component video signal, comprising steps of: extracting a first predetermined frequency component from the luminance signal components in three-dimensional frequency space; eliminating a second predetermined frequency component from the luminance signal components according to the size of the first predetermined frequency component when elimination of the dot crawls is designated; and eliminating minute-level components varying in a temporal direction when elimination of the time-axis noises is designated. Therefore, one of the dot crawls and the time-axis noises, or both of these can be effectively eliminated.

According to a 16th aspect of the present invention, in the video signal processing method of the 15th aspect, the first predetermined frequency component is extracted by filtering the luminance signal components in a horizontal direction with a filter having a pass-band of 3.58 MHz, and further filtering the signal components in a temporal direction with a filter having a pass-band of 15 Hz. Therefore, pixels in which dot crawls occur can be specified, and one of the dot crawls and the time-axis noises or both of these can be effectively eliminated.

According to a 17th aspect of the present invention, there is provided a video signal processing method by which cross color interferences and time-axis noises are eliminated from color-difference signal components of a component video signal, comprising steps of: eliminating minute-level components varying in a temporal direction of the color-difference signal components when elimination of the time-axis noises is designated; obtaining a difference value of the color-difference signal components between the present frame and an immediately preceding frame when elimination of the cross color interferences is designated; extracting a predetermined frequency component of luminance signal components of the component video signal; obtaining a difference value of the luminance signal components between the present frame and the immediately preceding frame; deciding that the cross color interferences are occurring when the absolute value of the difference value of the color-difference signal components between the present frame and the immediately preceding frame is equal to or larger than a first predetermined value, the absolute value of the predetermined frequency component of the luminance signal components is equal to or larger than a second predetermined value, and the absolute value of the difference value of the luminance signal components between the present frame and the immediately preceding frame is equal to or smaller than a third predetermined value; and subtracting one-half of the difference value of the color-difference signal components between the present frame and the immediately preceding frame from the color-difference signal components, or replacing the color-difference signal components with an average value of the present frame and the immediately preceding frame, when it is decided that the cross color interferences are occurring. Therefore, one of the cross color interferences and the time-axis noises or both of these can be effectively eliminated.

According to an 18th aspect of the present invention, in the video signal processing method of the 17th aspect, the predetermined frequency component of the luminance signal components is extracted by filtering the luminance signal components with a horizontal band-pass filter having a pass-band of 3.58 MHz. Therefore, pixels in which cross color interferences occur can be specified, and one or both of the cross color interferences and the time-axis noises can be effectively eliminated.

According to a 19th aspect of the present invention, there is provided a video signal processing apparatus comprising: a first subtracter for subtracting a first output of a noise detector from luminance signal components of a component video signal; a first frame memory for storing an output of the first subtracter for one frame period; a second subtracter for subtracting an output of the first frame memory from the luminance signal components; a first filter for extracting a predetermined frequency component from the output of the first subtracter; a second filter for extracting a predetermined frequency component from an output of the second subtracter; a third subtracter for subtracting a second output of the noise detector from color-difference signal components of the component video signal; a second frame memory for storing an output of the third subtracter for one frame period; a fourth subtracter for subtracting an output of the second frame memory from the color-difference signal components; a designation input means for inputting from outside designation as to which noises among dot crawls, cross color interferences and time-axis noises are to be eliminated; the noise detector for receiving the respective outputs of the first filter, the second filter, the second subtracter and the fourth subtracter, and the designation inputted by the designation input means as to which noises among dot crawls, cross color interferences and time-axis noises are to be eliminated, deciding a third output on the basis of the respective outputs of the second filter and the first filter when elimination of the dot crawls is designated, deciding a second output on the basis of the respective outputs of the first filter, the second subtracter and the fourth subtracter when elimination of the cross color interferences is designated, deciding a first output on the basis of the output of the second subtracter and a second output on the basis of the output of the fourth subtracter when elimination of the time-axis noises is designated; and a fifth subtracter for subtracting the third output of the noise detector from the output of the first subtracter. Therefore, one of the dot crawls, cross color interferences and the time-axis noises, or an arbitrary combination of these noises can be effectively eliminated with a simple structure.

DETAILED DESCRIPTION OF THE PREFERRED EMBODIMENTS

Hereinafter, embodiments of the present invention will be described with reference to the drawings.

[Embodiment 1]

Figure 1:
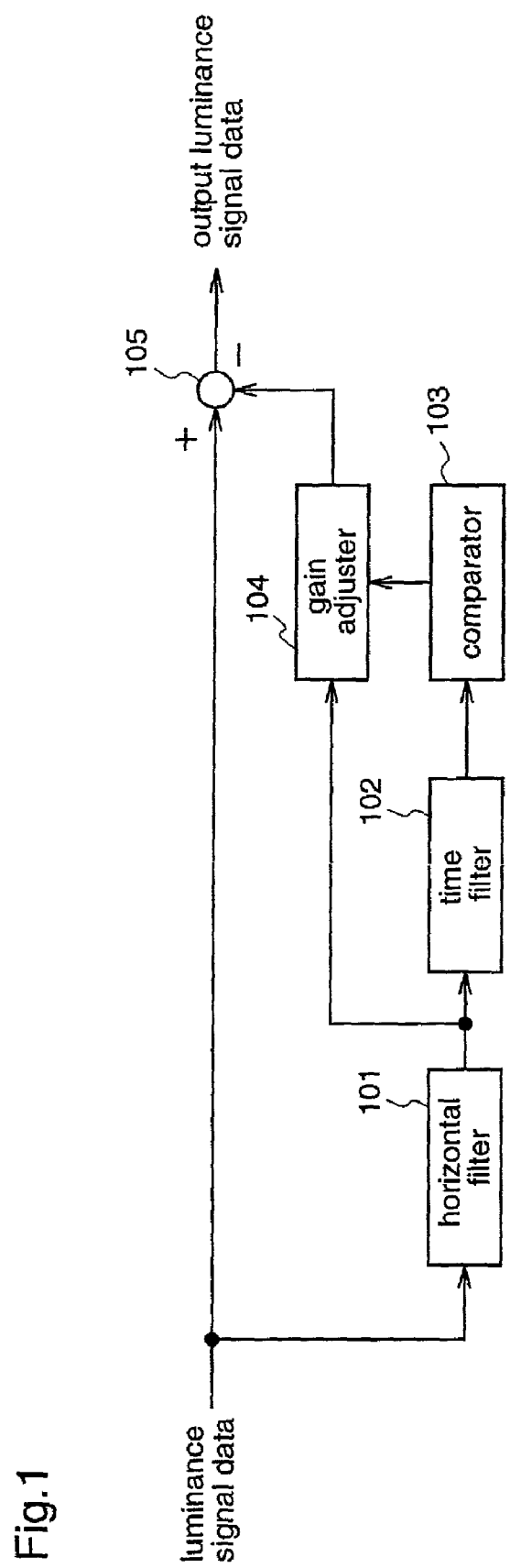
FIG. 1 is a block diagram illustrating a structure of a video signal processing apparatus according to a first embodiment of the present invention.

FIG. 1 is a block diagram illustrating a structure of a video signal processing apparatus according to a first embodiment of the present invention. In FIG. 1, reference numeral 101 denotes a horizontal filter, numeral 102 denotes a time filter, numeral 103 denotes a comparator, numeral 104 denotes a gain adjuster, arid numeral 105 denotes a subtracter.

The video signal processing apparatus according to the first embodiment eliminates dot crawls from a component video signal. Here, the operation of the video signal processing apparatus according to the first embodiment will be described.

Luminance signal data of the component video signal is inputted to the video signal processing apparatus of FIG. 1. The input luminance signal data is filtered by the horizontal filter 102. Here, the frequency characteristics of the horizontal filter 101 are those of a band-pass filter having the frequency of 3.58 MHz of a carrier signal in an NTSC signal as a pass-band. The output of the horizontal filter 101 is outputted to the time filter 102 and the gain adjuster 104.

The time filter 102 performs filtering in the time-axis direction for each pixel. Here, the frequency characteristics of the time filter 102 are those of a high-pass filter whose pass-band is a signal of temporal frequency 15 Hz (properly speaking, 29.97/2 Hz). This filter can be realized, for example, by halving a difference value between the present frame and the immediately preceding frame. The output of the time filter 102 is outputted to the comparator 103.

The comparator 103 compares the absolute value of the output signal of the time filter 102 with a predetermined threshold. Here, two thresholds TH1 and TH2 (provided that TH1<TH2) are employed. In this case, the comparator 103 decides whether the absolute value of the output signal of the time filter 102 is smaller than TH1, or equal to or larger than TH1 and smaller than TH2, or equal to or larger than TH2, and an obtained result is outputted to the gain adjuster 104.

Figure 2:
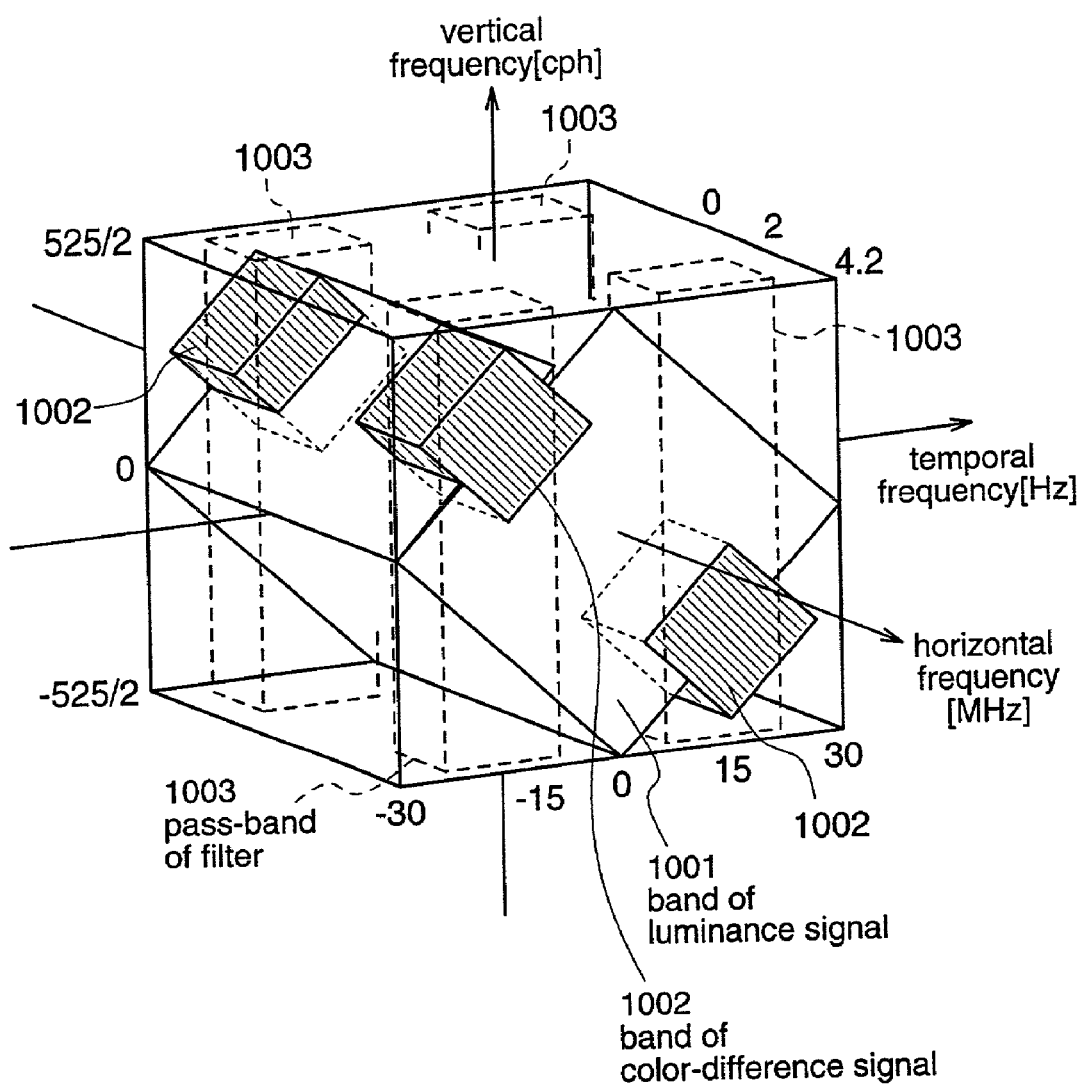
FIG. 2 is a view schematically showing filter characteristics of combination of a horizontal filter and a time filter in the video signal processing apparatus according to the first embodiment.
Figure 17:
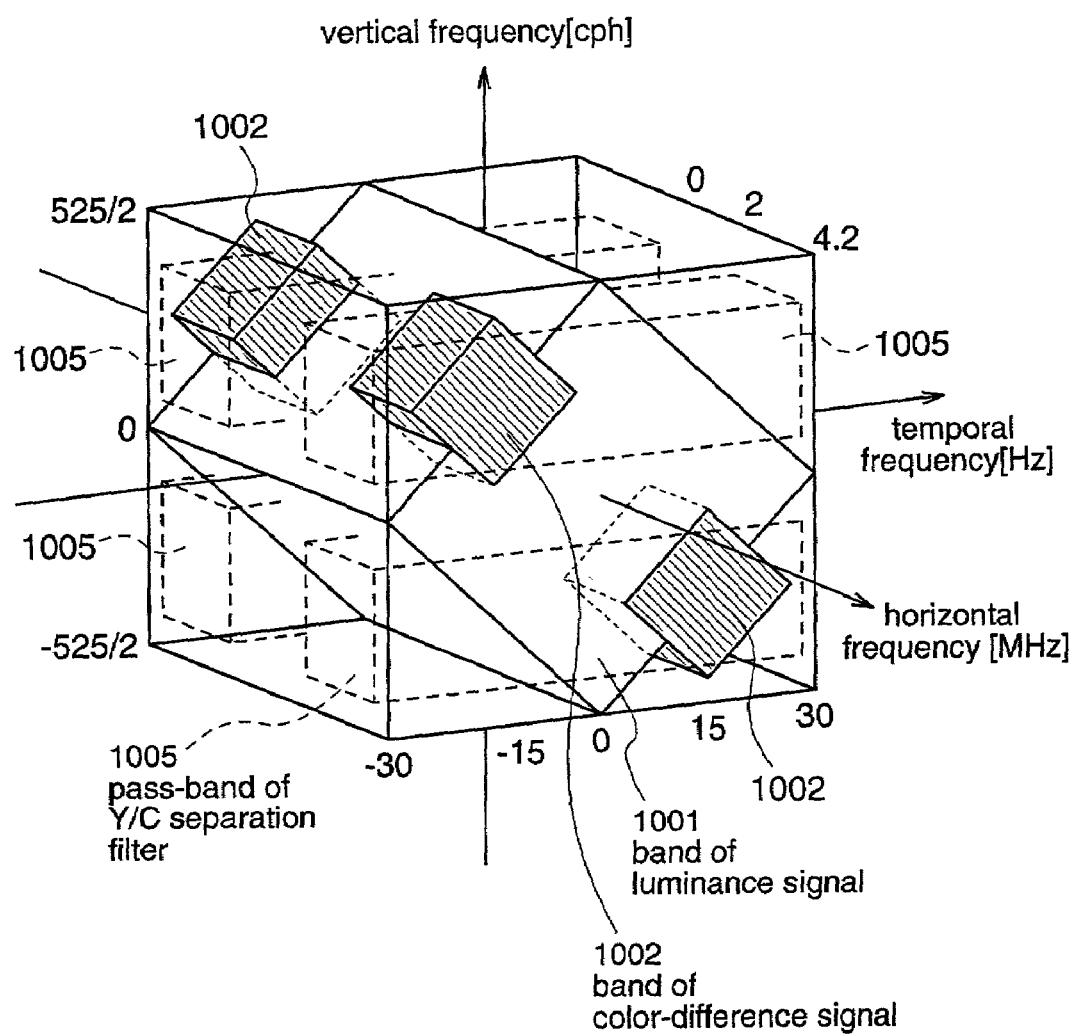
FIG. 17 is a view schematically showing three-dimensional frequency characteristics of two-dimensional Y/C separation.

Here, the filter characteristics of a combination of the horizontal filter 101 and the time filter 102 are shown in FIG. 2. FIG. 2 represents an NTSC signal in three-dimensional frequency space. In FIG. 2, a large rectangular parallelepiped 1001 in the center represents a band of the luminance signal, and hatched small rectangular parallelepipeds 1002 represent bands of the color-difference signals. Further, rectangular parallelepipeds 1003 shown by dotted lines represent pass-bands of a combination of the horizontal filter 101 and the time filter 102. As can be seen from FIG. 2, the pass-bands 1003 of the combined filter includes parts of the bands 1002 of the color-difference signals, lying off the frequency bands 1005 in FIG. 17, which are extracted by a Y/C separation filter as color-difference signals. Therefore, with the combination of these filters, when the threshold judgement is performed for the absolute value of the filter output value using the comparator 103, high frequency components of the color-difference signals remaining in the luminance signal after the two-dimensional Y/C separation or three-dimensional Y/C separation can be extracted.

The gain adjuster 104 changes the gain of the output of the horizontal filter 101 according to the comparison result of the comparator 103, and outputs the changed gain. For example, when the absolute value of the output signal of the time filter 102 is smaller than TH1, the comparator 103 outputs gain 0 (i.e., no output), and when the absolute value is equal to or larger than TH1 and smaller than TH2, the comparator 103 outputs gain ½, and when the absolute value is equal to or larger than TH2, the comparator 103 outputs gain 1 (i.e., outputs the input as it is). The output of the gain adjuster 104 is inputted to the subtracter 105.

The subtracter 105 outputs a signal that is obtained by subtracting the output of the gain adjuster 104 from the inputted luminance signal.

As described above, the video signal processing apparatus according to the first embodiment receives luminance signal components of a component video signal, extracts a first predetermined frequency component in a three-dimensional frequency area from the luminance signal, and eliminates a second predetermined frequency component from the luminance signal according to the size of the first predetermined frequency component. When the first predetermined frequency component is extracted by filtering the luminance signal with the horizontal band-pass filter having a pass-band of 3.58 MHz and further filtering the signal with the temporal high-pass filter having a pass-band of 15 Hz, pixels in which dot crawls occur can be specified. Further, when the second predetermined frequency component is obtained by filtering the luminance signal with the horizontal band-pass filter having a pass-band of 3.58 MHz, the dot crawls can be greatly reduced. When the second predetermined frequency component is subtracted from the luminance signal, the gain of the second predetermined frequency component is changed according to the first predetermined frequency component value, whereby no process is carried out for the inputted luminance signal in areas where no dot crawl is occurring, so that blurring of video can be minimized. As described above, when the video signal processing method and the video signal processing apparatus according to the present invention is employed, the dot crawls superimposed upon the luminance signal components of the component video signal can be eliminated with a simple structure.

Figure 3:
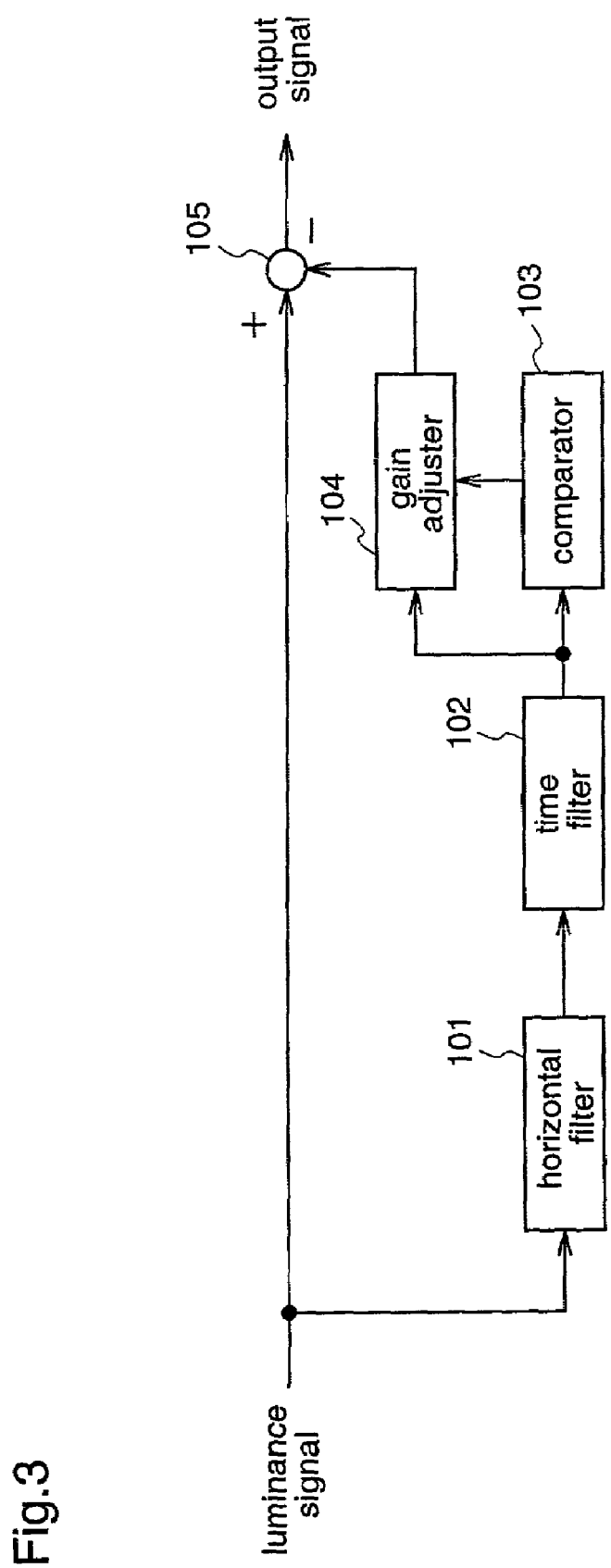
FIG. 3 is a block diagram illustrating a structure of a variation of the video signal processing apparatus according to the first embodiment.

In this first embodiment, the signal that is obtained in the gain adjuster 104, by gain adjusting the output of the horizontal filter 101, is subtracted from the luminance signal. However, a signal that is obtained by gain adjusting the output of the time filter 102 may be subtracted from the luminance signal. FIG. 3 is a block diagram illustrating a structure of a variation of the video signal processing apparatus according to the first embodiment, which subtracts a signal that is obtained in the gain adjuster 104 by gain adjusting the output of the time filter 102, from the luminance signal. The operation of the variation shown in FIG. 3 is identical to that of the video signal processing apparatus shown in FIG. 1 except in that the second predetermined frequency component is obtained by filtering the luminance signal with a horizontal band-pass filter having a pass-band of 3.58 MHz and further filtering the signal with a temporal high-pass filter having a pass-band of 15 MHz. Also according to the variation shown in FIG. 3, like in the video signal processing apparatus of FIG. 1, the dot crawls superimposed upon the luminance signal components of the component video signal can be eliminated with a simple structure.

In this first embodiment, the case where gain is adjusted in the gain adjuster 104 to one of three levels (0, ½, and 1) has been described, but another number of levels or gain values may be employed.

Further, in this first embodiment, the horizontal filter 101 is a filter having a pass-band of 3.58 MHz, while it is not required that 3.58 MHz should be completely the center frequency of the pass-band, as long as the pass-band includes 3.58 MHz.

[Embodiment 2]

Figure 4:
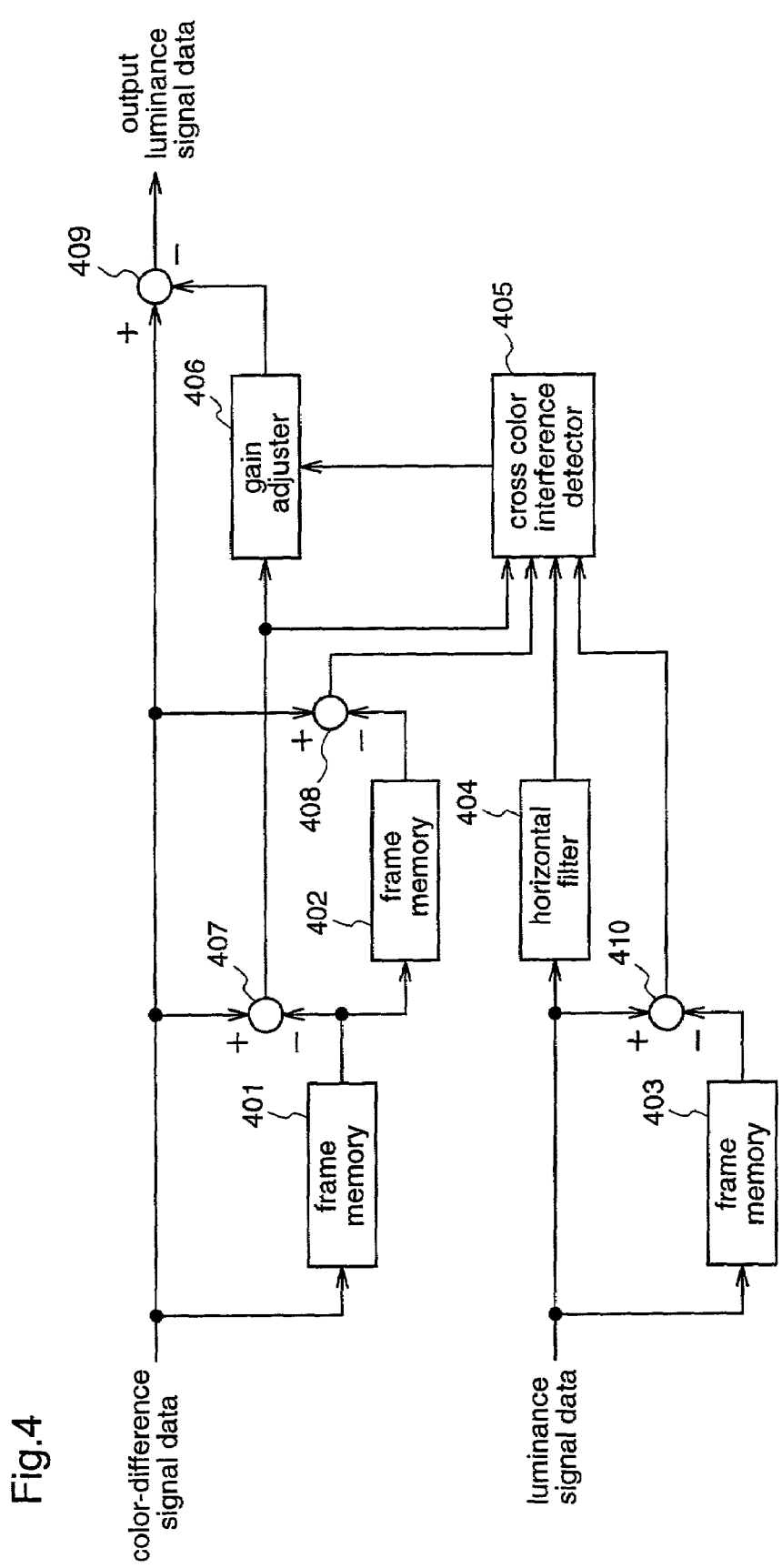
FIG. 4 is a block diagram illustrating a structure of a video signal processing apparatus according to a second embodiment of the present invention.

FIG. 4 is a block diagram illustrating a structure of a video signal processing apparatus according to the second embodiment of the present invention. In FIG. 4, numerals 401 to 403 denote a frame memory, respectively. Numeral 404 denotes a horizontal filter. Numeral 405 denotes a cross color detector. Numeral 406 denotes a gain adjuster. Numerals 407 to 410 denote a subtracter, respectively.

The video signal processing apparatus of the second embodiment eliminates cross color interferences from a component video signal.

In an NTSC signal, a color signal is multiplexed into a luminance signal. In this case, a signal that is obtained by modulating a color subcarrier (frequency of 3.58 MHz) with a color signal is multiplexed. The frequency of 3.58 MHz is 227.5 times as high as the horizontal scan frequency (15.75 kHz). Therefore, the color subcarriers of adjacent scan lines in the same field are shifted by a half cycle, which are shown in FIG. 18.

Figure 18:
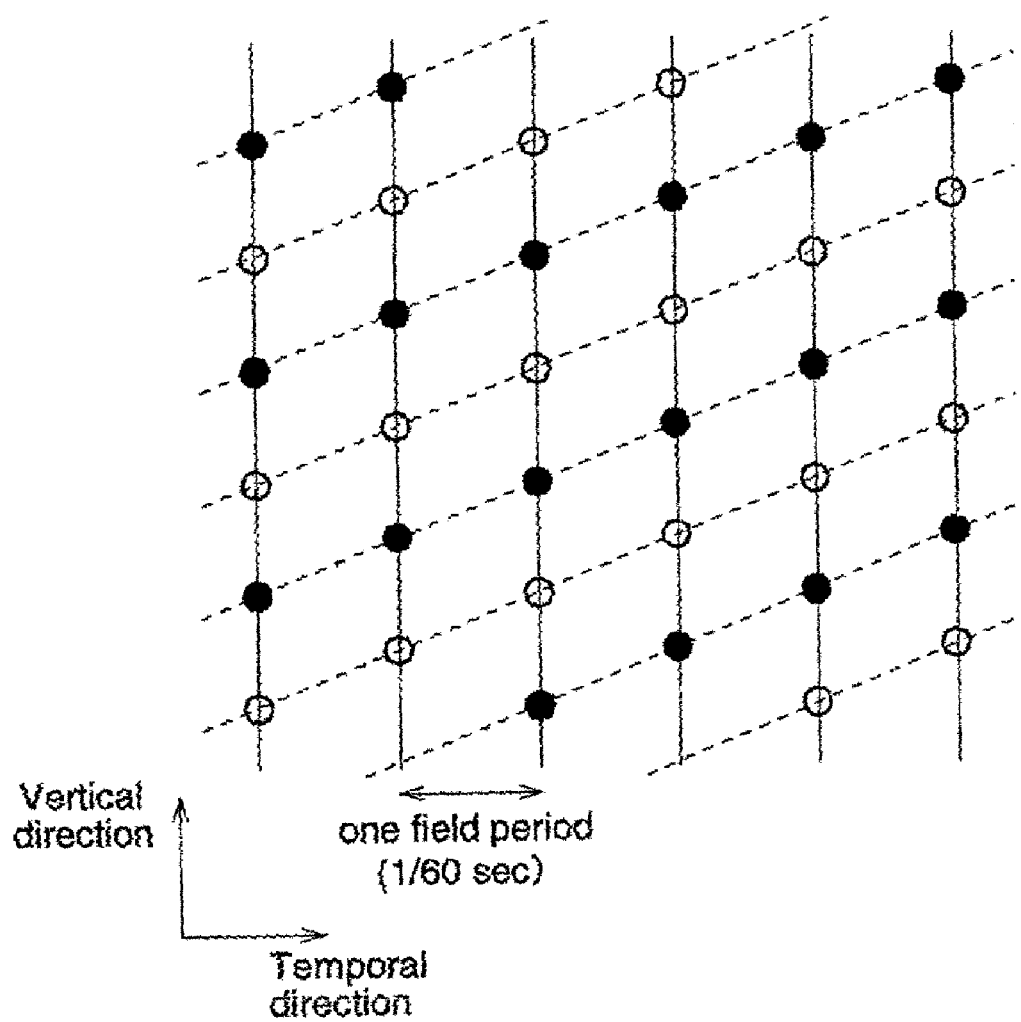
FIG. 18 is a diagram showing successive fields and scan lines existing within the fields, seen in a temporal-vertical plane.

FIG. 18 is a diagram showing successive fields and scan lines existing within the fields, seen in a temporal-vertical plane. Here, a circle shows a scan line. A scan line shown by an open circle shows that the amplitude of the color subcarrier has the maximum positive value and a scan line shown by a black circle shows that the amplitude of the color subcarrier has the maximum negative value. As can be seen from FIG. 18, paying attention to pixels in the same position on the screen, when the pixels are 2 fields away from each other, the color subcarriers are in inverted phases, and when the pixels are 4 fields away from each other, the color subcarriers are in phases.

The cross color interferences are noises resulting from separation of components which are originally a luminance signal, as a color signal, at the Y/C separation. It is assumed here that original luminance signal components detected as the cross color interferences have an almost fixed value in the temporal direction. In this case, when color signals in a cross color part that have become component video signals due to Y/C separation are 2 fields away from each other, the difference between pixel values of pixels in the same position on the screen is large (in inverted phases), and when the signals are 4 fields away from each other, the difference between pixel values of pixels in the same position on the screen is small (in phases). Here, the pixel value is assumed to be a value that is obtained when the component video signal is digitally represented.

The video signal processing apparatus according to the second embodiment eliminates cross color interferences, with paying attention to the fact that the cross color interferences has the above-mentioned characteristics in the component video signal.

Hereinafter, the operation of the video signal processing apparatus according to the second embodiment will be described.

Color-difference signal data of a component video signal is inputted to the frame memory 401, and the subtracters 407, 408 and 409. The frame memory 401 delays the inputted color-difference signal data by one frame, and outputs the delayed data. The output of the frame memory 401 is inputted to the frame memory 402 and the subtracter 407. The subtracter 407 receives the color-difference signal data and the output of the frame memory 401, subtracts the output of the frame memory 401 from the color-difference signal data, and outputs an obtained result. That is, the subtracter 407 outputs the difference value between color-difference signal data of the present frame and color-difference signal data of the immediately preceding frame. The output of the subtracter 407 is inputted to the cross color detector 405 and the gain adjuster 406.

The frame memory 402 delays the inputted color-difference signal data by another one frame and outputs the delayed data. The output of the frame memory 402 is inputted to the subtracter 408. The subtracter 408 receives the color-difference signal data and the output of the frame memory 402, subtracts the output of the frame memory 402 from the color-difference signal data, and outputs an obtained result. That is, the subtracter 408 outputs the difference value between the color-difference signal data of the present frame and the color-difference signal data of two frames before. The output of the subtracter 408 is inputted to the cross color detector 405.

On the other hand, luminance signal data of the component video signal is inputted to the frame memory 403, the horizontal filter 404, and the subtracter 410. The frame memory 403 delays the inputted luminance signal data by one frame, and outputs delayed data. The output of the frame memory 403 is inputted to the subtracter 410. The subtracter 410 receives the luminance signal data and the output of the frame memory 410, subtracts the output of the frame memory 410 from the luminance signal data, and outputs an obtained result. That is, the difference value between the luminance signal data of the present frame and luminance signal data of the immediately preceding frame is outputted from the subtracter 410. The output of the subtracter 410 is inputted to the cross color detector 405.

The luminance signal data inputted to the horizontal filter 404 is subjected to band-pass filtering with 3.58 MHz as a pass-band and then outputted. The output of the horizontal filter 404 is inputted to the cross color detector 405.

The cross color detector 405 receives the outputs of the subtracters 407, 408 and 410, and the output of the horizontal filter 404. The cross color detector 405 decides that cross color interferences are detected, when the absolute value of the output of the horizontal filter 404 is equal to or larger than a first predetermined threshold, the absolute value of the output of the subtracter 410 is equal to or smaller than a second predetermined threshold, the absolute value of the output of the subtracter 407 is equal to or larger than a third predetermined threshold, and the absolute value of the output of the subtracter 408 is equal to or smaller than a fourth predetermined threshold. To be more specific, when the luminance signal components are at 3.58 MHz, there are few temporal changes in the luminance signal components, there are temporal changes in the color-difference signal components, and the temporal changes vary in a cycle of two frames, the detector 405 detects cross color interferences. The cross color detector 405 outputs the detected result to the gain adjuster 406.

The gain adjuster 406 receives the detection result of the cross color detector 405 and the output of the subtracter 407, changes gain of the output of the subtracter 407 according to the detection result of the cross color detector 405, and outputs an obtained result. For example, when the cross color detector 405 detects cross color interferences, the gain adjuster 406 halves the output of the subtracter 407, and outputs the halved data. When the cross color detector 405 detects no cross color, the gain adjuster 406 changes the gain of the output of the subtracter 407 to 0, and outputs the same (i.e., does not output any data). The output of the gain adjuster 406 is inputted to the subtracter 409.

The subtracter 409 receives the color-difference signal data and the output of the gain adjuster 406, subtracts the output of the gain adjuster 406 from the color-difference signal data, and outputs an obtained result. That is, when the cross color detector 405 detects cross color interferences, one-half of the difference value between the color-difference signal data of the present frame and color-difference signal data of the immediately preceding frame is subtracted from the color-difference signal data of the present frame. This is equivalent to obtaining an average value of the color-difference signal data of the present frame and the color-difference signal data of the immediately preceding frame. On the other hand, when the cross color detector 405 detects no cross color, the color-difference signal data is outputted as it is.

As described above, the video signal processing apparatus according to the second embodiment receives luminance signal data and color-difference signal data of a component video signal and, as for the luminance signal data, extracts a predetermined frequency component in the horizontal direction and further obtains the difference value between the present frame and the immediately preceding frame. As for the color-difference signal data, the difference value between the present frame and the immediately preceding frame, and the difference value between the present frame and a frame that is two frames before the present frame. Then, when the predetermined frequency component value in the horizontal direction of the luminance signal data is equal to or larger than a first predetermined value, the absolute value of the difference value of the luminance signal data between the present frame and the immediately preceding frame is equal to or smaller than a second predetermined value, the absolute value of the difference value of the color-difference signal data between the present frame and the immediately preceding frame is equal to or larger than a third predetermined value, and the absolute value of the difference value of the color-difference signal data between the present frame and a frame that is two frames before is equal to or larger than a fourth predetermined value, one-half of the difference value of the color-difference signal between the present frame and the immediately preceding frame is subtracted from the color-difference signal data, or the color-difference signal data is replaced with an average value of the present frame and the immediately preceding value. Here, when the predetermined frequency component is obtained by filtering the luminance signal with the horizontal band-pass filter having a pass-band of 3.58 MHz, pixels in which cross color interferences occur can be specified. To be more specific, when the luminance signal components are at 3.58 MHz, the luminance signal components have few temporal changes, the color-difference signal components have temporal changes, and these temporal changes vary in a cycle of two frames, this is decided as cross color interferences. Then, when the cross color are detected, the cross color interferences are eliminated by being replaced with an average value of the color-difference signal data of the present frame and the immediately preceding frame. When the video signal processing method and video signal processing apparatus according to the present invention is used, cross color interferences superimposed upon color-difference signal components of a component video signal can be eliminated with a simple structure.

Figure 5:
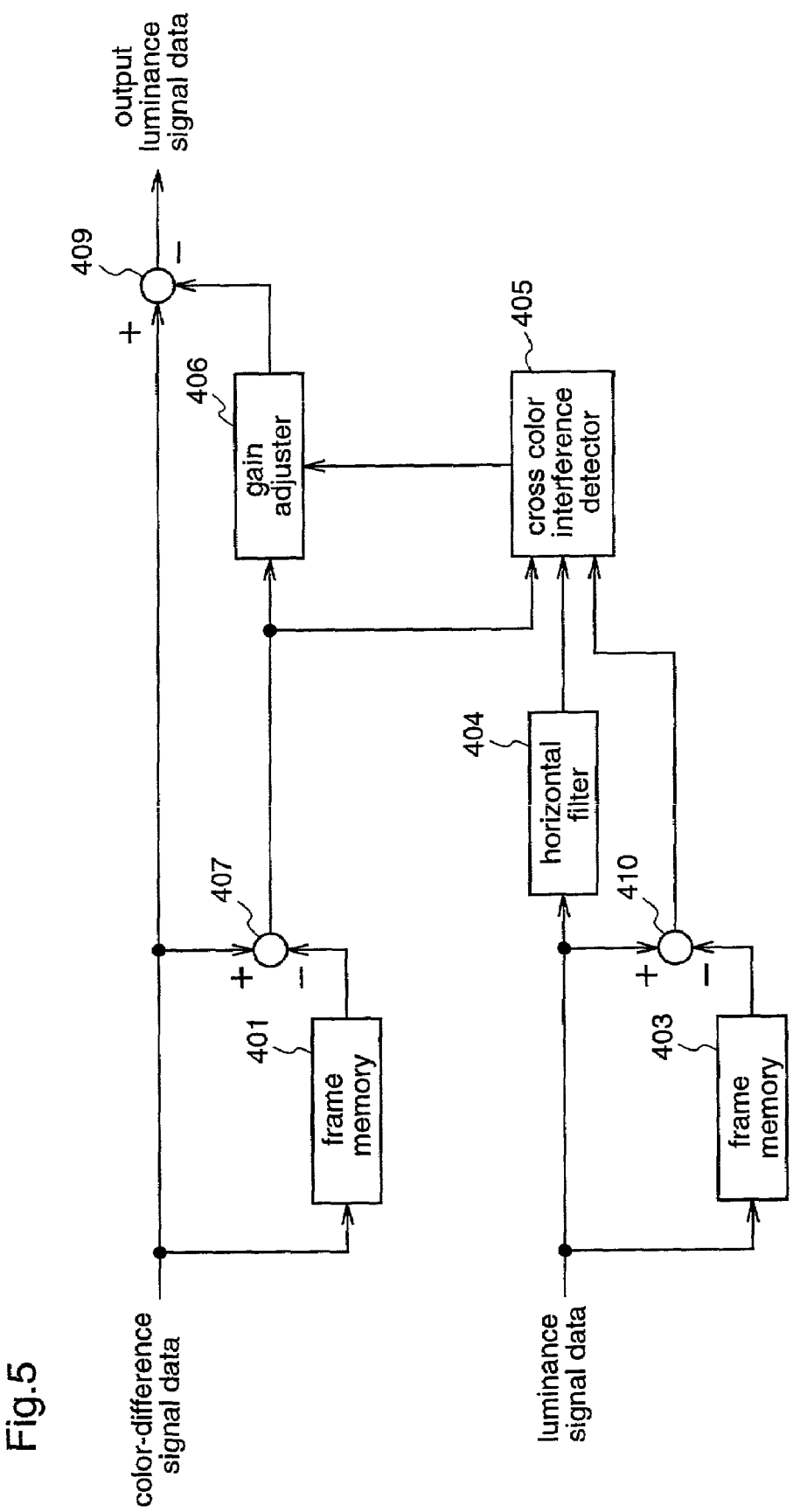
FIG. 5 is a block diagram illustrating a structure of a variation of the video signal processing apparatus according to the second embodiment.

In this second embodiment, the frame memories for two frames (frame memories 401 and 402) are used for the color-difference signal data, while this construction can be realized by a frame memory for one frame. FIG. 5 is a block diagram illustrating a structure of a variation of the video signal processing apparatus according to the second embodiment, including a frame memory for one frame. FIG. 5 shows a structure that is obtained by deleting the frame memory 402 from the structure shown in FIG. 4. Accordingly, the difference of the color-difference signal data between the present frame and a frame that is two frames before is not inputted to the cross color detector 405. Further, the cross color detection in the cross color detector 405 is performed by a detection method in which there is no condition judgement as to the difference of the color-difference signal data between the present data and the frame that is two frame before. In this case, the cross color detector 405 decides that cross color interferences are detected when the absolute value of the output of the horizontal filter 404 is equal to or larger than the first predetermined threshold, the absolute value of the output of the subtracter 410 is equal to or smaller than the second predetermined threshold, and the absolute value of the output of the subtracter 407 is equal to or larger than the third predetermined threshold. To be more specific, the cross color detector 405 decides that cross color interferences are detected when the luminance signal components are at 3.58 MHz, the luminance signal components have few temporal changes, and the color-difference signal components have temporal changes. Therefore, while the accuracy of the cross color detection is somewhat reduced as compared to the case of the structure shown in FIG. 4, the frame memories can be reduced to a frame for one frame, whereby the hardware costs can be reduced.

[Embodiment 3]

A video signal processing apparatus according to a third embodiment of the present invention simultaneously eliminates an arbitrary combination of noises among three noises of dot crawls, cross color interferences, and time-axis noises, from a component video signal. Here, the time-axis noises refer to noises of minute level occurring at random in the temporal direction.

Figure 19:
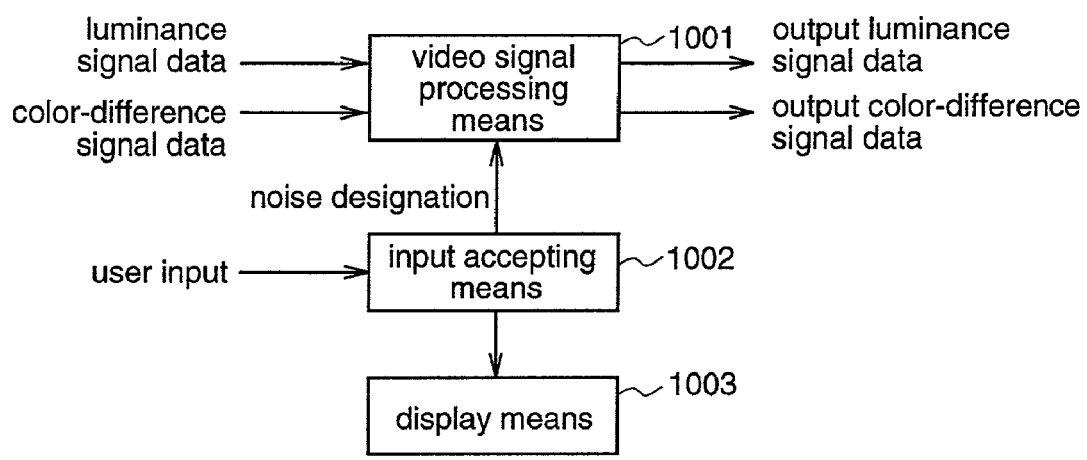
FIG. 19 is a block diagram illustrating a structure of a video signal processing apparatus according to the third embodiment.

Initially, a method for designating which combination of noises among the three noises is to be eliminated will be described with reference to FIG. 19. FIG. 19 is a block diagram illustrating a structure of a video signal processing apparatus comprising a video signal processing means 1001, an input accepting means 1002, and a display means 1003.

Figure 20:
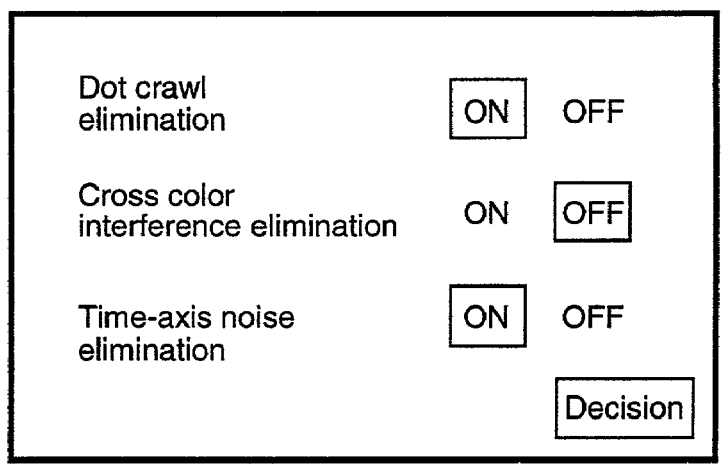
FIG. 20 is a diagram showing an example of display that is made by a display means of the video signal processing apparatus according to the third embodiment.

In the video signal processing apparatus of the third embodiment, the user designates which noises are to be eliminated among three noises of dot crawls, cross color interferences and time-axis noises. The display means 1003 makes a display for showing the kinds of noises and whether these noises are to be eliminated or not. FIG. 20 shows an example of the display. In FIG. 20, a case of designating a combination that the dot crawls are to be eliminated, the cross color interferences are not eliminated, and the time-axis noises are to be eliminated is shown. The user designates which noises are to be eliminated, using this display, by means of a remote control. The combination designated by the user is displayed on the display means 1003 though the input accepting means 1002.

When the combination is decided by the user, the combination is inputted to the video signal processing means 1001 though the input accepting means 1002.

Figure 6:
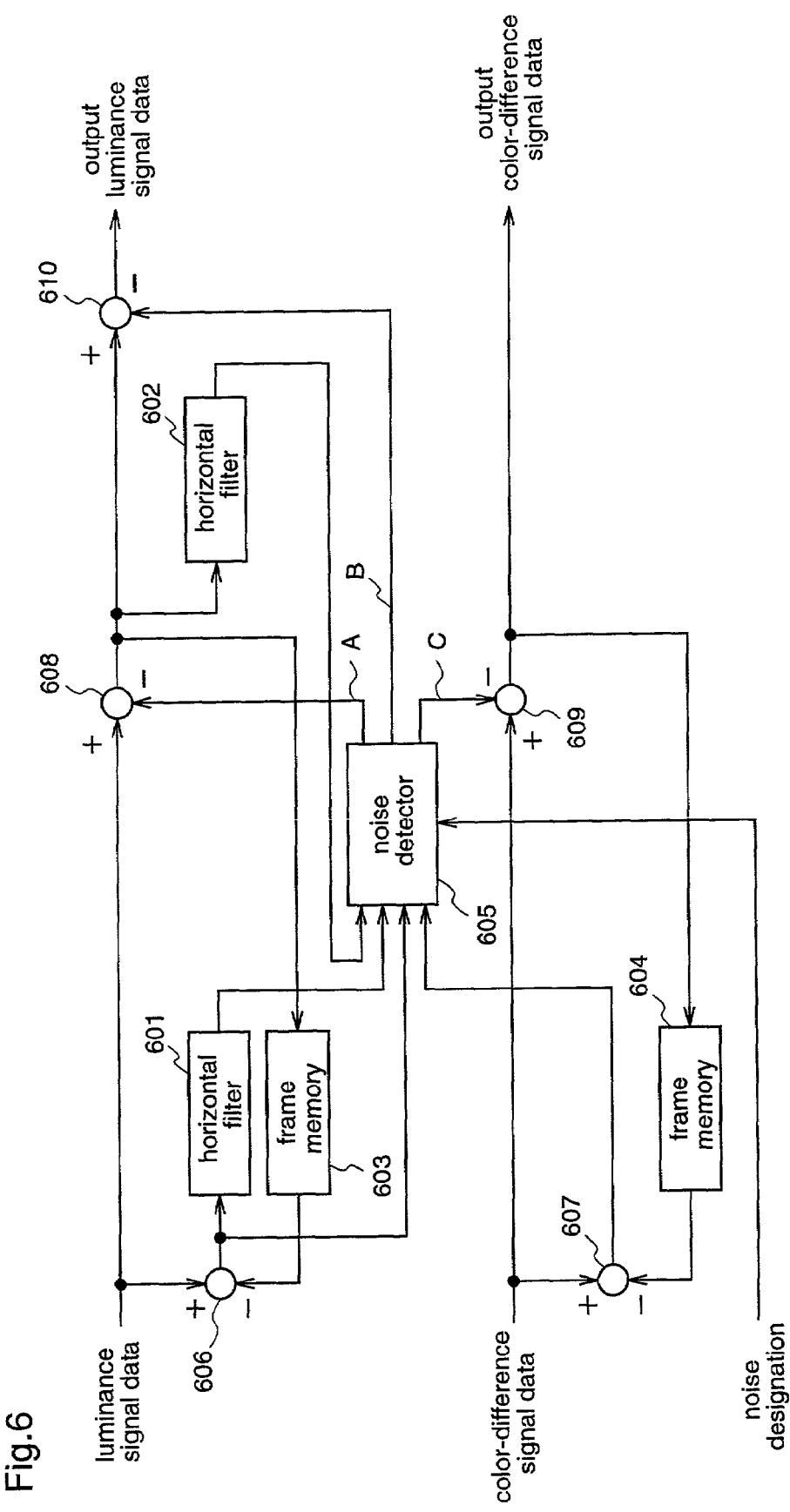
FIG. 6 is a block diagram illustrating a structure of a video signal processing means in a video signal processing apparatus according to a third embodiment of the present invention.

Next, the specific structure of the video signal processing means 1001 will be described. FIG. 6 is a block diagram illustrating a specific structure of the video signal processing means 1001 according to the third embodiment. In FIG. 6, numerals 601 and 602 denote a horizontal filter, respectively. Numerals 603 and 604 denote a frame memory, respectively. Numeral 605 denotes a noise detector. Numerals 606 to 610 denote a subtracter, respectively.

Luminance signal data of a component video signal is inputted to the subtracters 606 and 608. The subtracter 608 receives the luminance signal data and an output A of the noise detector 605 (its operation will be described later), subtracts the output A of the noise detector 605 from the luminance signal data, and outputs an obtained result. The output of the subtracter 608 is inputted to the subtracter 610, the horizontal filter 602, and the frame memory 603.

The frame memory 603 receives the output of the subtracter 608, delays the inputted signal by one frame period, and outputs the delayed signal. The output of the frame memory 603 is inputted to the subtracter 606.

The subtracter 606 receives the luminance signal data and the output of the frame memory 603, subtracts the output of the frame memory 603 from the luminance signal data, and outputs an obtained result. This subtraction result is inputted to the horizontal filter 601 and the noise detector 605.

The horizontal filter 601 subjects the output of the subtracter 606 to band-pass filtering of a pass-band of 3.58 MHz, and outputs an obtained result. The output of the horizontal filter 601 is inputted to the noise detector 605.

The horizontal filter 602 subjects the output of the subtracter 608 to band-pass filtering of a pass-band of 3.58 MHz, and outputs an obtained result. The output of the horizontal filter 602 is inputted to the noise detector 605.

On the other hand, color-difference signal data of the component video signal is inputted to the subtracters 607 and 609.

The subtracter 609 receives the color-difference signal data and an output C of the noise detector 605 (its operation will be described later), subtracts the output of the noise detector 605 from the color-difference signal data, and outputs an obtained result. The output of the subtracter 609 is inputted to the frame memory 604.

The frame memory 604 receives the output of the subtracter 609, delays the inputted signal by one frame period, and outputs the delayed signal. The output of the frame memory 604 is inputted to the subtracter 607.

The subtracter 607 receives the color-difference signal data and the output of the frame memory 604, subtracts the output of the frame memory 604 from the color-difference signal data, and outputs an obtained result. This subtraction result is inputted to the noise detector 605.

The noise detector 605 receives the outputs of the horizontal filters 601 and 602, and the outputs of the subtracters 606 and 607. The noise detector 605 further receives a designation for eliminating one of the dot crawls, the cross color interferences and the time-axis noises, or an arbitrary combination thereof, from outside.

Figure 7:
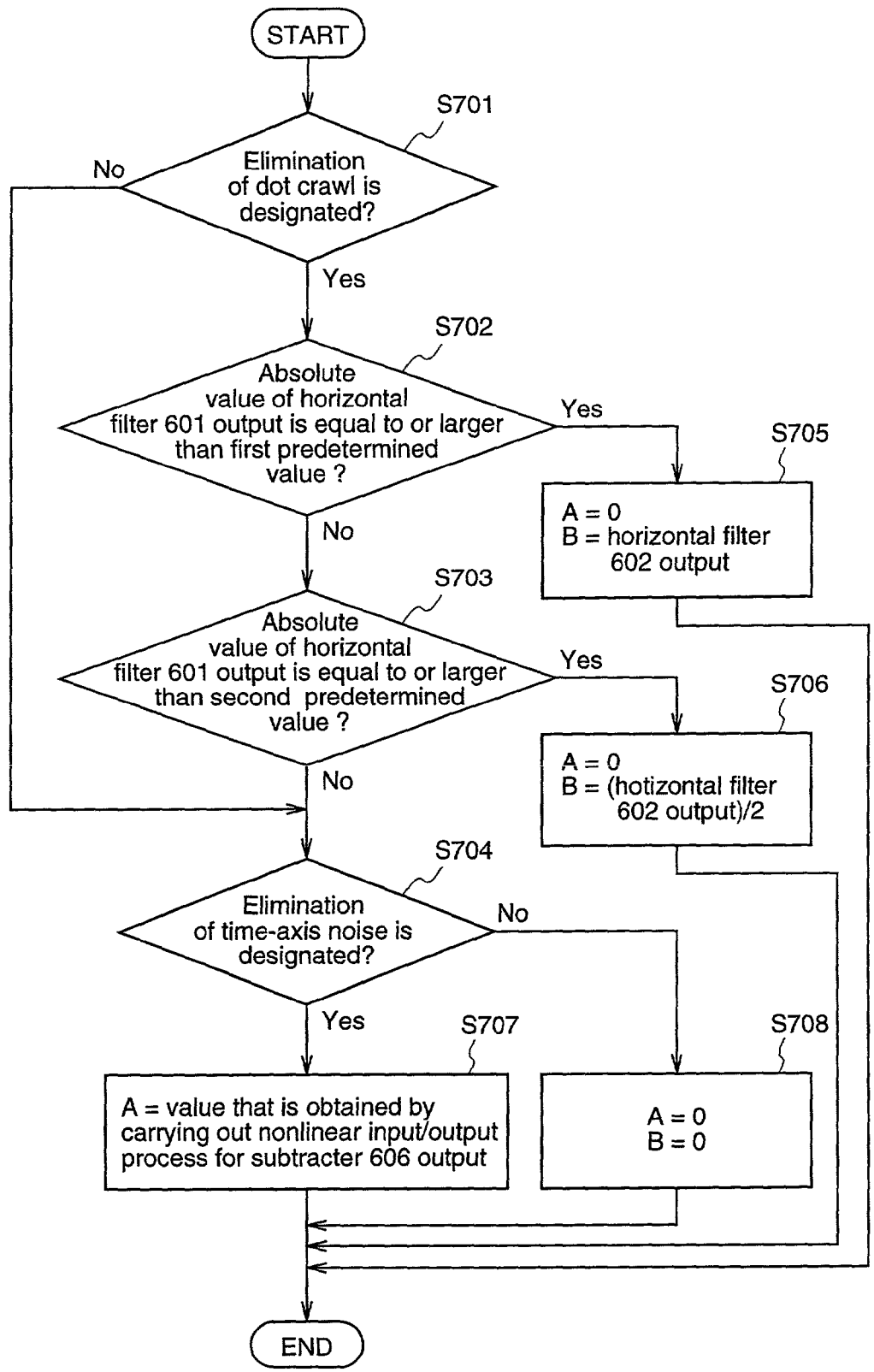
FIG. 7 is a flowchart for explaining an operation of the video signal processing apparatus according to the third embodiment.
Figure 9:
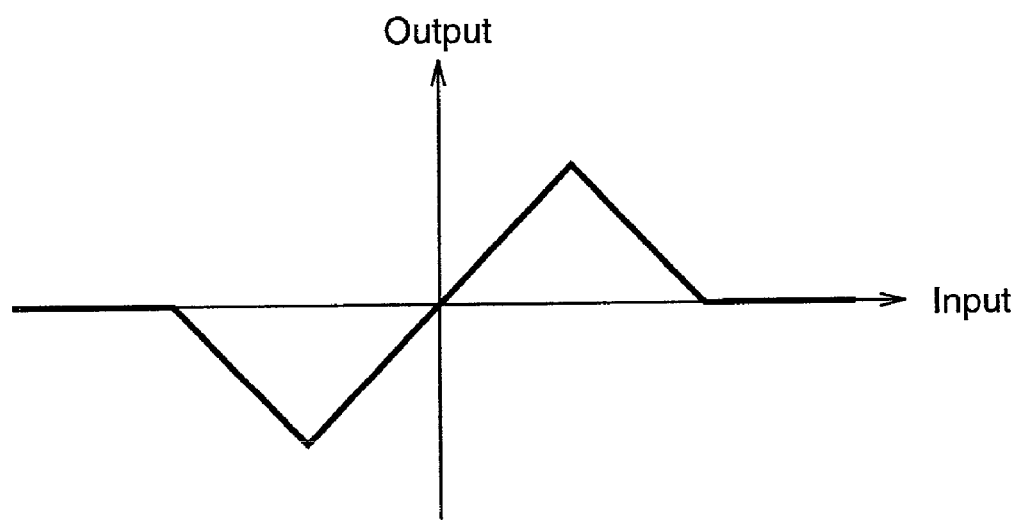
FIG. 9 is a view schematically showing an example of input/output characteristics of a nonlinear process that is used for time-axis noise elimination in the video signal processing apparatus according to the third embodiment.

As the operation of the noise detector 605, a method for deciding the outputs A and B will be initially described with reference to FIG. 7. FIG. 7 is a flowchart for explaining the operation of the noise detector 605 when the outputs A and B are to be decided. Here, the outputs A and B are both used to eliminate noises (i.e., dot crawls or time-axis noises) from the luminance signal data, and the output A is used for elimination of the time-axis noises while the output B is used for elimination of the dot crawls. Initially, in step S701, it is judged whether the elimination of dot crawls is designated or not. When this judgement result is "Yes" the operation proceeds to step S702, and when the result is "No" the operation proceeds to step S704. In step S702, it is judged whether the absolute value of the output of the horizontal filter 601 is equal to or larger than a first predetermined value. When this judgement result is "Yes" the operation proceeds to step S705, and when the result is "No" the operation proceeds to step S703. In step S705, the output A is decided to be 0 and the output B is decided to be the output of the horizontal filter 602, thereby finishing the operation. In step S703, it is judged whether the absolute value of the output of the horizontal filter 601 is equal to or larger than a second predetermined value. It is assumed here that the second predetermined value is smaller than the first predetermined value. When this judgement result is "Yes" the operation proceeds to step S706, and when the result is "No" the operation proceeds to step S704. In step S706, the output A is decided to be 0 and the output B is decided to be one-half of the output of the horizontal filter 602, thereby finishing the operation. In step S704, it is judged whether the elimination of time-axis noises is designated or not. When this judgement result is "Yes" the operation proceeds to step S707, and when the result is "No" the operation proceeds to step S708. In step S707, the output A is decided to be a value that is obtained by carrying out a nonlinear process for the output of the subtracter 606, and the output B is decided to be 0. Here, the input/output characteristics of the nonlinear process used in step S707 are shown in FIG. 9. In Step S708, the outputs A and B are both decided to be 0.

Figure 8:
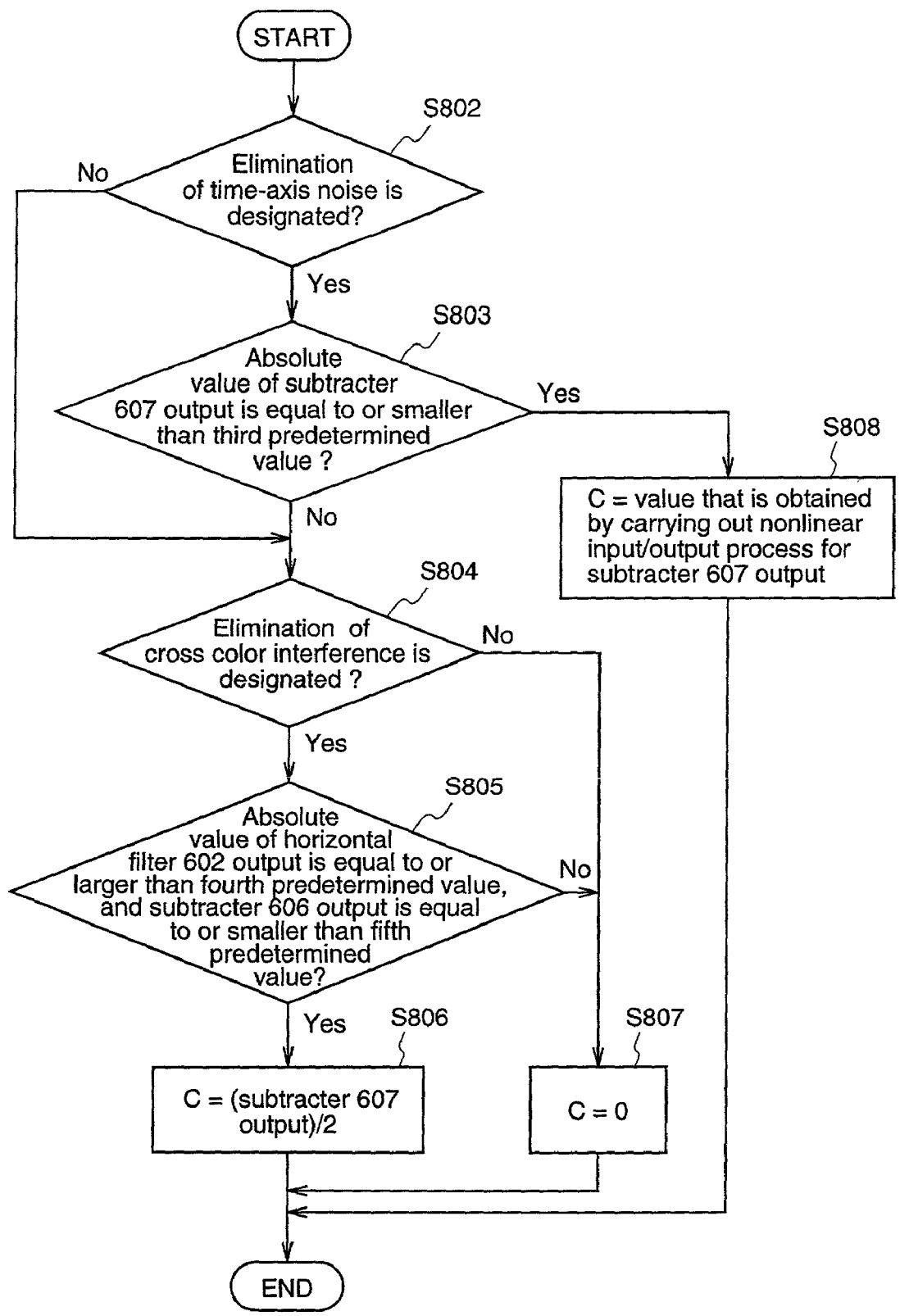
FIG. 8 is a flowchart for explaining the operation of the video signal processing apparatus according to the third embodiment.

As the operation of the noise detector 605, a method for deciding the output C will be described next with reference to FIG. 8. FIG. 8 is a flowchart for explaining the operation of the noise detector 605 when the output C is to be decided. Here, the output C is used to eliminate noises of the color-difference signal data (i.e., cross color interferences or time-axis noises).

Initially, in step S802, it is judged whether the elimination of time-axis noises is designated or not. When the judgement result is "Yes" the operation proceed to step S803, and when the result is "No" the operation proceed to step S804. In step S803, it is judged whether the absolute value of the output of the subtracter 607 is equal to or smaller than a third predetermined value. When the judgement result is "Yes" the operation proceed to step S808, and when the result is "No" the operation proceed to step S804. In step S808, the output C is decided to be a value that is obtained by carrying out the nonlinear process for the output of the subtracter 607. Here, the input/output characteristics of the nonlinear process employed in step S808 are shown in FIG. 9. In step S804, it is judged whether elimination of cross color interferences is designated or not. When this judgement result is "Yes" the operation proceeds to step S805, and when this result is "No" the operation proceeds to step S807. In step S805, it is judged whether the absolute value of the output of the horizontal filter 602 is equal to or larger than a fourth predetermined value, and the output of the subtracter 606 is equal to or smaller than a fifth predetermined value. When this judgement result is "Yes" the operation proceeds to step S806, and when this result is "No" the operation proceeds to step S807. In step S806, the output C is decided to be one-half of the output of the subtracter 607. In step S807, the output C is decided to be 0.

Among the outputs of the noise detector 605, the output A is inputted to the subtracter 608, the output B is inputted to the subtracter 610, and the output C is inputted to the subtracter 609.

The subtracter 610 receives the output of the subtracter 608 and the output B of the noise detector 605, subtracts the output B of the noise detector 605 from the output of the subtracter 608, and outputs an obtained result. This is output luminance signal data. Further, the output of the subtracter 609 is output color-difference signal data.

The noise detector 605 outputs the outputs A, B and C as described above. When the elimination of time-axis noises is designated, the output of the subtracter 608 and the output of the subtracter 609 are data from which noises in the temporal direction have been eliminated. When the elimination of dot crawls is designated, the output of the subtracter 610 is data from which dot crawls have been eliminated. Further, when the elimination of cross color interferences is designated, the output of the subtracter 609 is data from which cross color interferences have been eliminated.

As described above, the video signal processing apparatus according to the third embodiment detects arbitrary noises among the dot crawls, the cross color interferences and the time-axis noises, utilizing horizontal filter output components, inter-frame difference data, horizontal filter output components of the inter-frame difference data of luminance signal data of a component video signal, and inter-frame difference data of color-difference signal data, and eliminates the detected noises.

More specifically, the video signal processing apparatus according to the third embodiment receives luminance signal components and color-difference signal components of a component video signal, and extracts a first predetermined frequency component in a three-dimensional frequency area, from the luminance signal. When elimination of the dot crawls is designated, a second predetermined frequency component is eliminated from the luminance signal components according to the size of the first predetermined frequency component. Here, when the first predetermined frequency component is extracted by filtering the luminance signal with a horizontal band-pass filter having a pass-band of 3.58 MHz and further filtering the signal with a temporal high-pass filter having a pass-band of 15 Hz, pixels in which the dot crawls occur can be specified. Further, when the second predetermined frequency component is obtained by filtering the luminance signal with a horizontal band-pass filter having a pass-band of 3.58 MHz, the dot crawls can be greatly reduced. In addition when the size of the first predetermined frequency component is smaller than a predetermined value while the elimination of the dot crawls is designated, or when the elimination of the dot crawls is not designated and elimination of the time-axis noises is designated, minute-level components varying in the temporal direction are eliminated.

At the elimination of dot crawls, when the second predetermined frequency component is subtracted from the luminance signal, the gain of the second predetermined frequency component is changed according to the first predetermined frequency component value, whereby no process is carried out for the inputted luminance signal in areas where no dot crawl is occurring, so that blurring of video can be minimized.

As for the color-difference signals, when elimination of the time-axis noises is designated, minute-level components varying in the temporal direction are eliminated. When the elimination of cross color interferences is designated, it is decided that cross color interferences are occurring when the absolute value of the difference value of the color-difference signal data between the present frame and an immediately preceding frame is equal to or larger than the third predetermined value, the predetermined frequency component in the horizontal direction of the luminance signal data is equal to or larger than the fourth predetermined value, and the absolute value of the difference value of the luminance signal data between the present frame and the immediately preceding frame is equal to or smaller than the fifth predetermined value, and then one-half of the difference value of the color-difference signal data between the present frame and the immediately preceding frame is subtracted from the color-difference signal data, or the color-difference signal data is replaced with an average value of the present frame and the immediately preceding frame. Here, when the predetermined frequency component for the luminance signal is obtained by filtering the luminance signal with a horizontal band-pass filter having a pass-band of 3.58 MHz, pixels in which cross color interferences occur can be specified. That is, when the luminance signal components are at 3.58 MHz, the luminance signal components have few temporal changes, and the color-difference signal components have temporal changes, this is judged to be cross color interferences. When the cross color interferences are detected, the cross color interferences are eliminated by being replaced with an average value of the color-difference signal data of the present frame and the immediately preceding frame.

Therefore, according to the video signal processing apparatus of the third embodiment, with a simple hardware configuration including a frame memory of one frame for each of luminance signal data and color-difference signal data, arbitrary noises among the dot crawls, the cross color interferences, and the time-axis noises can be eliminated from a component video signal, whereby the hardware scale and hardware costs can be reduced as compared to a structure in which elimination of these noises is performed using corresponding independent hardware.

Figure 10:
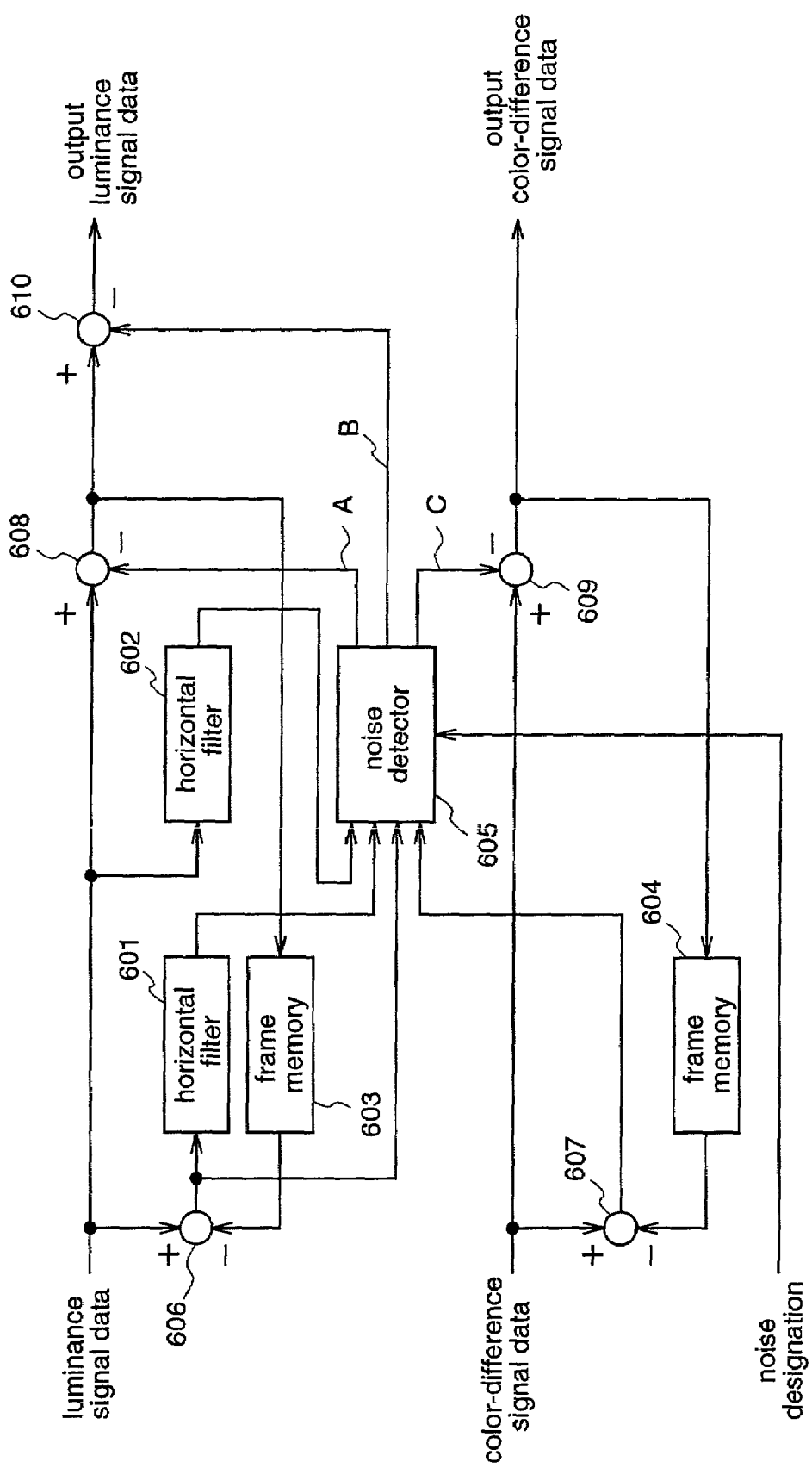
FIG. 10 is a block diagram illustrating a structure of a variation of the video signal processing apparatus according to the third embodiment.

In this third embodiment, the horizontal filter 602 is located in the latter stage of the subtracter 608, while the horizontal filter may be located in the former stage of the subtracter 608. FIG. 10 is a block diagram illustrating a structure of a variation of the video signal processing apparatus according to the third embodiment, in which the horizontal filter 602 is located in the former stage of the subtracter 608. The operation of the variation shown in FIG. 10 is identical to the operation of the video signal processing apparatus shown in FIG. 6, except in that the horizontal filter 602 performs filtering for luminance signal data from which the time-axis noises have not been eliminated yet. Also according to the variation shown in FIG. 10, like the video signal processing apparatus of FIG. 6, arbitrary noises among the dot crawls, the cross color interferences, and the time-axis noises can be eliminated from the component video signal, with a simple hardware configuration.

Figure 11:
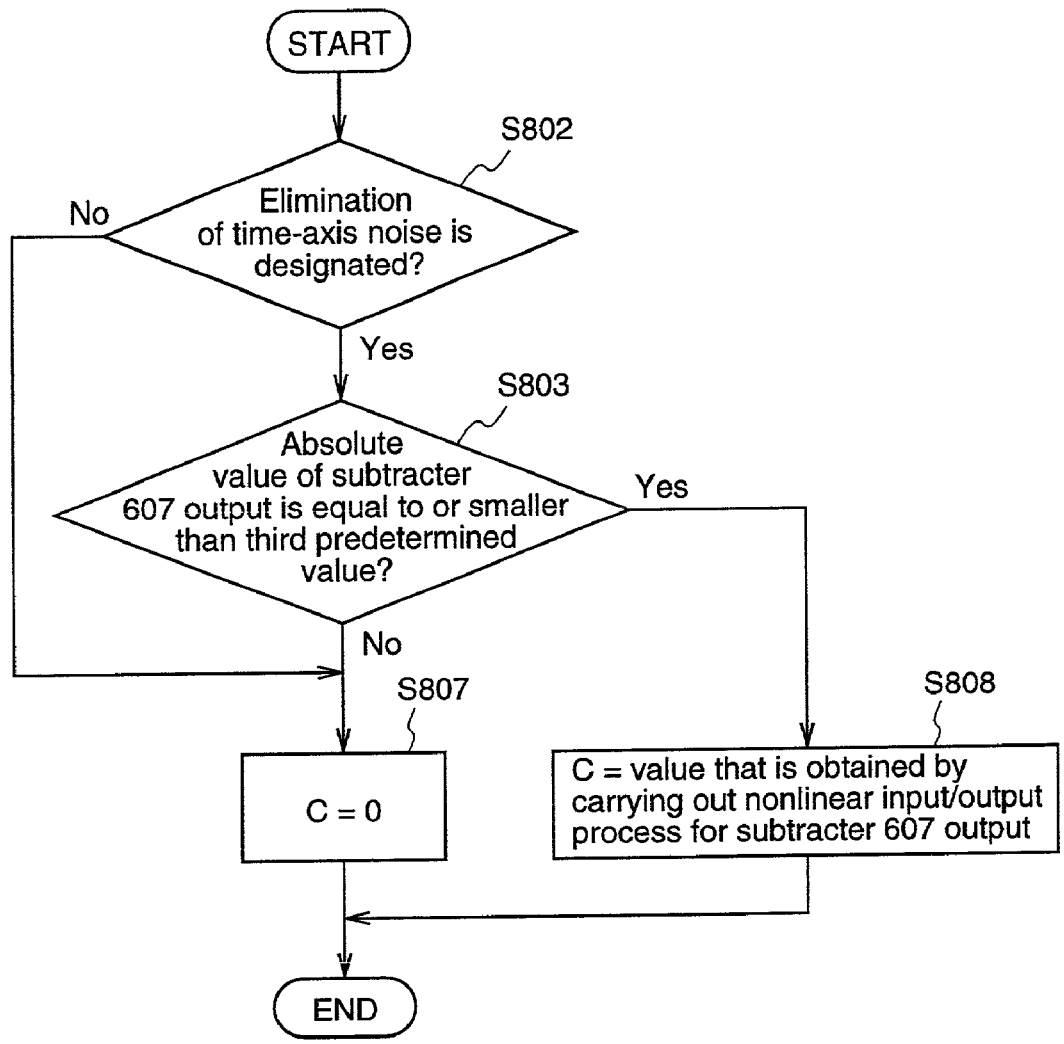
FIG. 11 is a flowchart for explaining an operation of the video signal processing apparatus according to the third embodiment.

Further, in this embodiment, an arbitrary combination of noises among three kinds of noises, i.e., the dot crawls, the cross color interferences, and the noises in the temporal direction, is eliminated, while an arbitrary combination of two kinds of noises may be eliminated. For example, when the noise detector 605 carries out processes in accordance with flows shown in FIGS. 7 and 11 with the same structure as that of the video signal processing apparatus of FIG. 6, a video signal processing apparatus that can eliminate an arbitrary combination of the dot crawls and the noises in the temporal direction can be realized. In this variation, the operation of the noise detector 605 when deciding the output C is different from that in the video signal processing apparatus according to the third embodiment. To be more specific, initially in step S802, it is judged whether elimination of the time-axis noises is designated or not. When this judgement result is "Yes" the operation proceeds to step S803, and when the result is "No" the operation proceeds to step S807. In step S803, it is judged whether the absolute value of the output of the subtracter 607 is equal to or smaller than a third predetermined value. When the judgement result is "Yes" the operation proceeds to step S808, and when the result is "No" the operation proceeds to step S807. In step S808, the output C is decided to be a value that is obtained by carrying out a nonlinear process for the output of the subtracter 607. In step S807, the output C is decided to be 0. Operations other than these are the same as those of the video signal processing apparatus according to the third embodiment. According to this variation, an arbitrary combination of the dot crawls and the noises in the temporal direction can be eliminated from the component video signal, with a simple hardware configuration.

Figure 12:
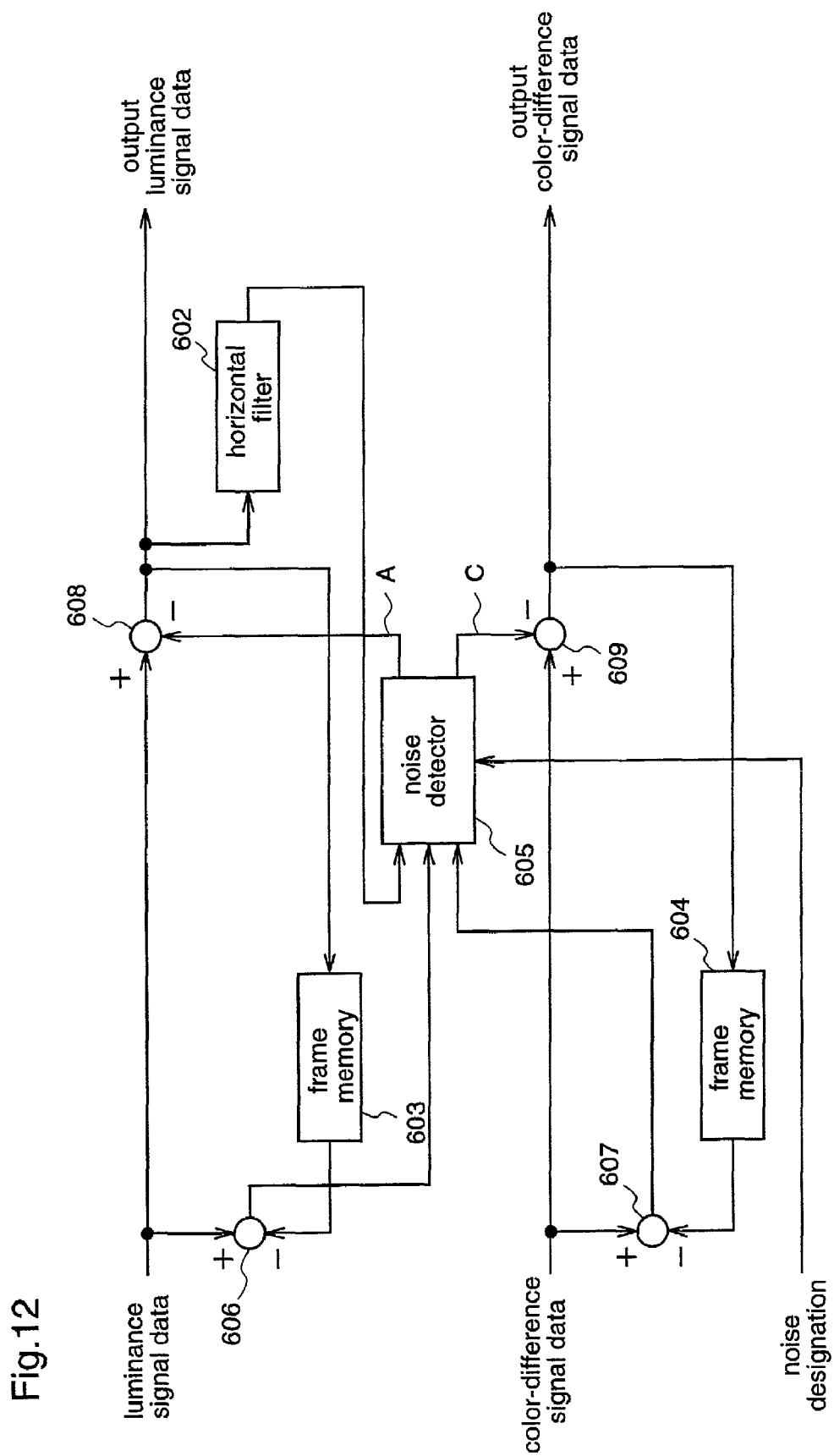
FIG. 12 is a block diagram illustrating a structure of another variation of the video signal processing apparatus according to the third embodiment.
Figure 13:
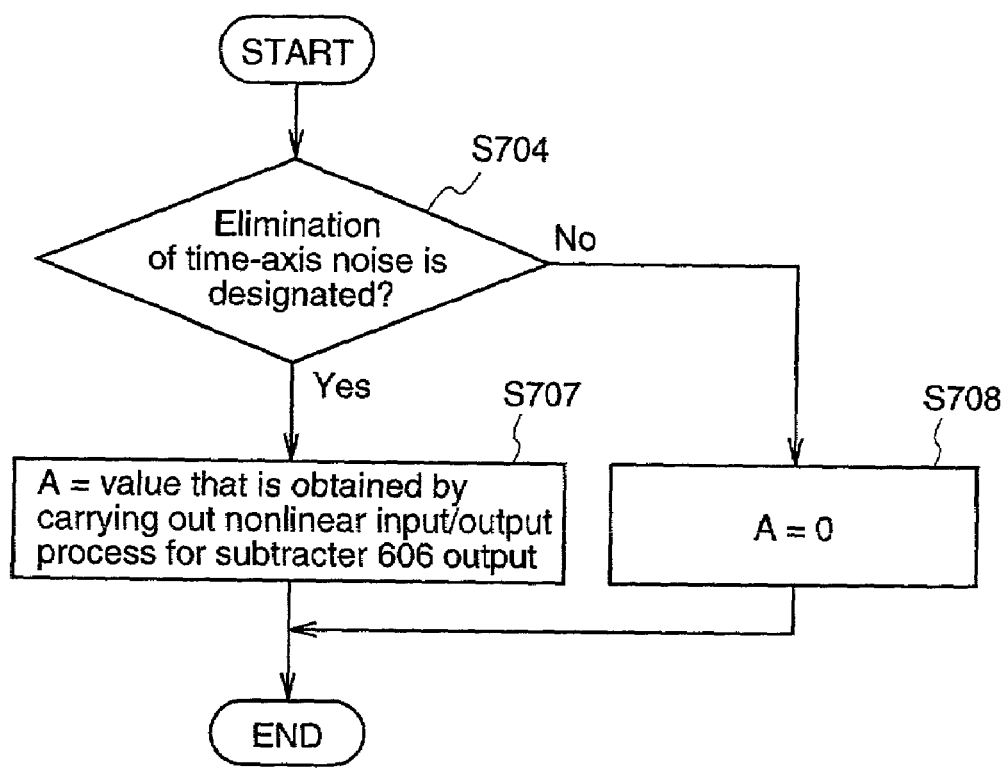
FIG. 13 is a flowchart for explaining an operation of the video signal processing apparatus according to the third embodiment.

FIG. 12 is a block diagram illustrating a structure of another variation of the video signal processing apparatus according to the third embodiment, which can eliminate an arbitrary combination of the cross color interferences and the noises in the temporal direction. In this variation, the apparatus has the structure as shown in FIG. 12 and the noise detector 605 carries out processes in accordance with flows shown in FIGS. 13 and 8. The noise detector 605 decides the output A in accordance with flows shown in FIG. 13, and decides the output C in accordance with flows shown in FIG. 8. To be more specific, in the flows shown in FIG. 13, initially in step S704, it is judged whether elimination of time-axis noises is designated or not. When the judgement result is "Yes" the operation proceeds to step S707, and when this result is "No" the operation proceeds to step S708. In step S707, the output A is decided to be a value that is obtained by carrying out the nonlinear process for the output of the subtracter 606. In step S708, the output A is decided to be 0. Flows for deciding the output C are the same as the flows for deciding the output C in the video signal processing apparatus according to the third embodiment. According to this variation, an arbitrary combination of the cross color interferences and the noises in the temporal direction can be eliminated from the component video signal, with a simple hardware configuration.

Figure 14:
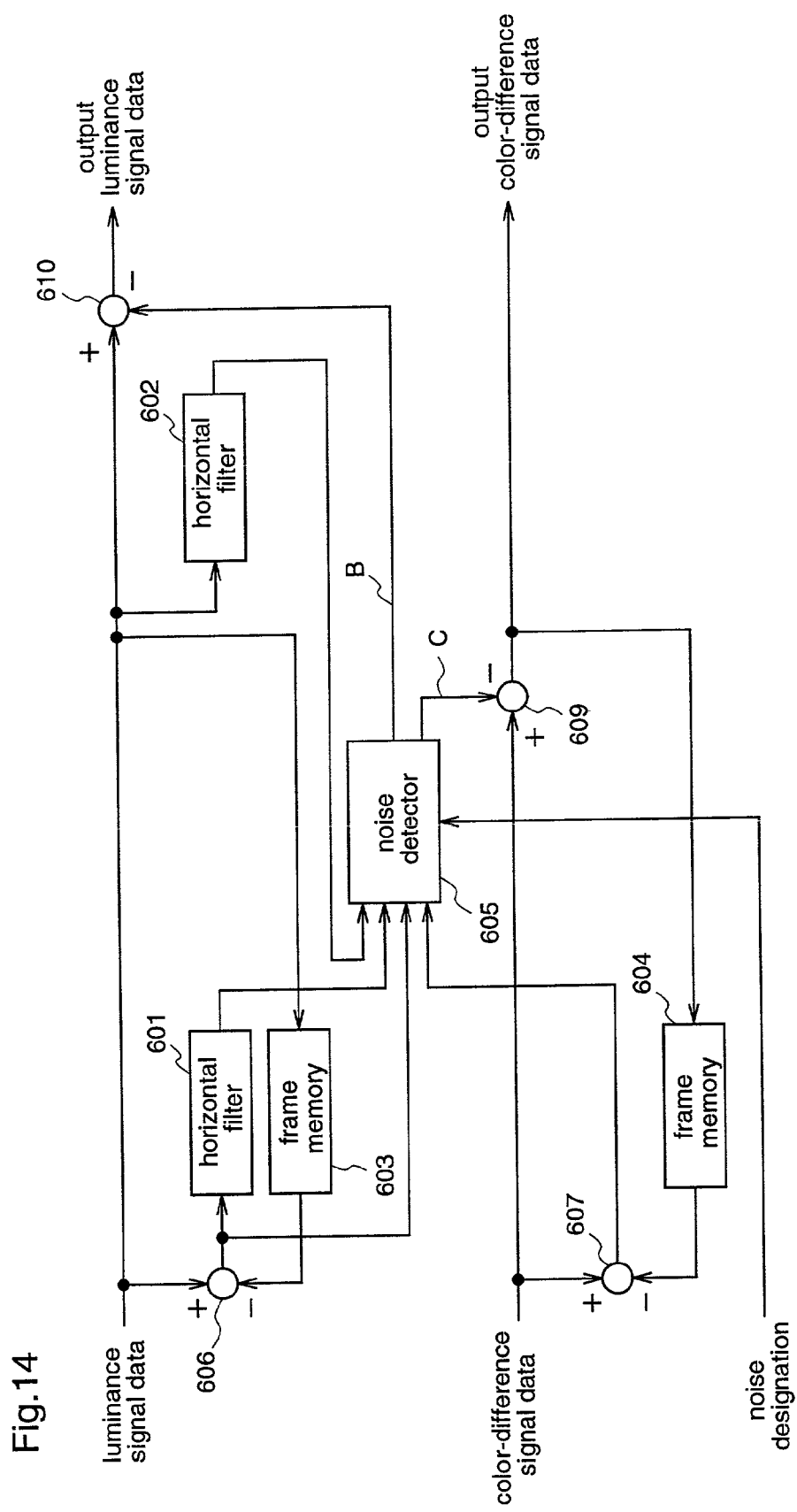
FIG. 14 is a block diagram illustrating a structure of still another variation of the video signal processing apparatus according to the third embodiment.
Figure 15:
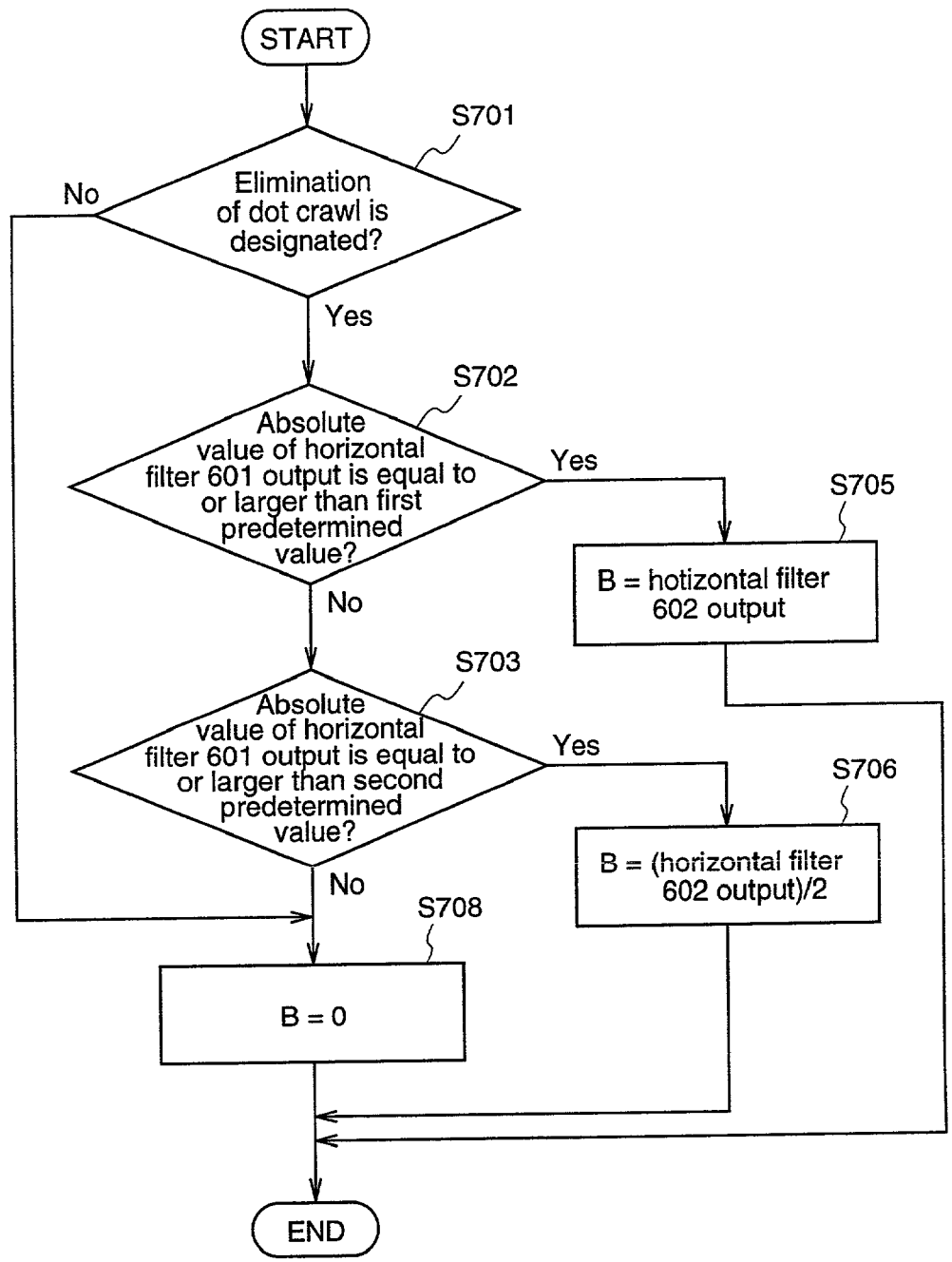
FIG. 15 is a flowchart for explaining an operation of the video signal processing apparatus according to the third embodiment.
Figure 16:
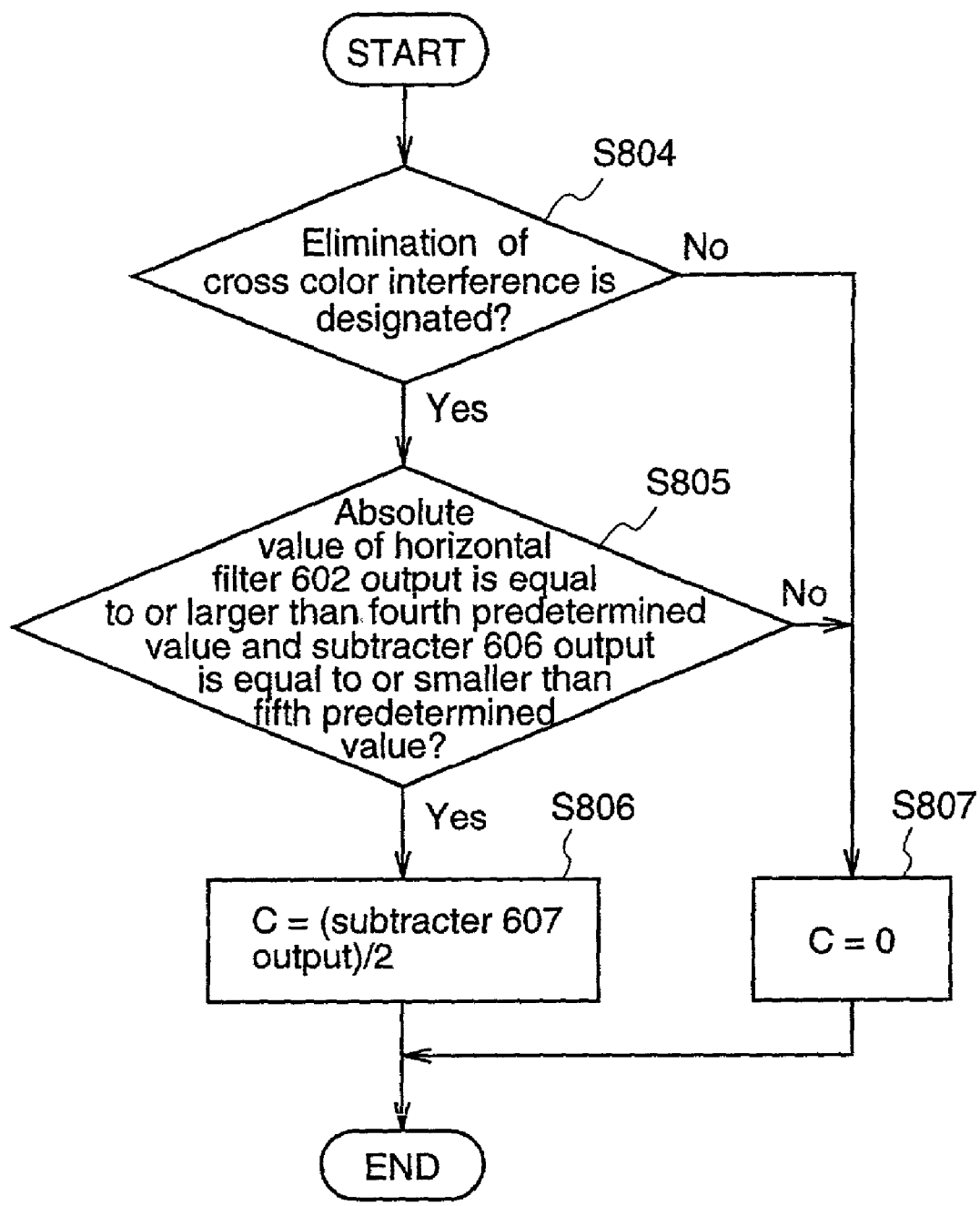
FIG. 16 is a flowchart for explaining an operation of the video signal processing apparatus according to the third embodiment.

FIG. 14 is a block diagram illustrating a structure of another variation of the video signal processing apparatus according to the third embodiment, which can eliminate an arbitrary combination of dot crawls and cross color interferences. In this variation, the apparatus has the structure as shown in FIG. 14, and the noise detector carries out processes in accordance with flows shown in FIGS. 15 and 16. The noise detector 605 decides the output B in accordance with flows shown in FIG. 15 and decides the output C in accordance with flows shown in FIG. 16. To be more specific, in the flows shown in FIG. 15, initially in step S701, it is judged whether the elimination of dot crawls is designated or not. When this judgement result is "Yes" the operation proceeds to step S702, and when the result is "No" the operation proceeds to step S708. In step S702, it is judged whether the absolute value of the output of the horizontal filter 601 is equal to or larger than a first predetermined value. When this judgement result is "Yes" the operation proceeds to step S705, and when the result is "No" the operation proceeds to step S703. In step S705, the output B is decided to be the output of the horizontal filter 602, thereby finishing the operation. In step S703, it is judged whether the absolute value of the output of the horizontal filter 601 is equal to or larger than a second predetermined value. It is assumed here that the second predetermined value is smaller than the first predetermined value. When this judgement result is "Yes" the operation proceeds to step S706, and when the result is "No" the operation proceeds to step S708. In step S706, the output B is decided to be one-half of the output of the horizontal filter 602, thereby finishing the operation. In step S708, the output B is decided to be 0. Further, in the flows shown in FIG. 16, initially in step S 804, it is judged whether the elimination of cross color interferences is designated or not. When this judgement result is "Yes" the operation proceeds to step S805, and when this result is "No" the operation proceeds to step S807. In step S805, it is judged whether the absolute value of the output of the horizontal filter 602 is equal to or larger than a fourth predetermined value, and the output of the subtracter 606 is equal to or smaller than a fifth predetermined value. When this judgement result is "Yes" the operation proceeds to step 806, and when the result is "No" the operation proceeds to step S807. In step S806, the output C is decided to be one-half of the output of the subtracter 607. In step S807, the output C is decided to be 0. According to this variation, an arbitrary combination of the dot crawls and the cross color interferences can be eliminated from the component video signal, with a simple hardware configuration.

Further, in the third embodiment, as the processing in the noise detector 605 in cases where the elimination of dot crawls is designated, the absolute value of the output of the horizontal filter 601 is compared with the first and second thresholds, thereby deciding the output B, as shown in FIG. 7. However, the output B can be decided by comparing the absolute value with only one predetermined value, or with three more thresholds.

In the third embodiment, as for the luminance signal components, the dot crawls are eliminated preferentially over the time-axis noises, and as for the color-difference signal components, the time-axis noises is eliminated preferentially over the cross color interferences. However, this order of priorities may be reversed.

Further, in this third embodiment, at the elimination of cross color interferences from the color-difference signal components, only when the absolute value of the output of the subtracter 607 is equal to or larger than the third predetermined value, it is decided that cross color interferences are detected, but this condition may be deleted.

What is claimed is:

1. A video signal processing method comprising:
   extracting a first predetermined frequency component in a three-dimensional frequency space from a luminance signal of a component video signal; and
   eliminating a second predetermined frequency component from the luminance signal according to the first predetermined frequency component value,
   wherein the first predetermined frequency component is extracted by filtering the luminance signal in a horizontal direction with a filter having a pass-band of 3.58 MHz, and further filtering the luminance signal in a temporal direction with a filter having a pass-band of 15 Hz.

2. A video signal processing method comprising:
   extracting a first predetermined frequency component in a three-dimensional frequency space from a luminance signal of a component video signal; and
   eliminating a second predetermined frequency component from the luminance signal according to the first predetermined frequency component value,
   wherein the second predetermined frequency component is obtained by filtering the luminance signal in a horizontal direction with a filter having a pass-band of 3.58 MHz, and further filtering the luminance signal in a temporal direction with a filter having a pass-band of 15 Hz.

3. A video signal processing apparatus comprising:
   a horizontal filter operable to receive luminance signal components of a component video signal, and operable to filter the luminance signal components of the component video signal in a horizontal direction;
   a time filter operable to filter an output of the horizontal filter in a temporal direction;
   a comparator operable to decide whether an output of the time filter is equal to or larger than a predetermined threshold;
   a gain adjuster operable to receive the output of the horizontal filter, operable to change a gain of the output of the horizontal filter according to a result of the comparator, and operable to output an obtained result; and
   a subtracter operable to subtract an output of the gain adjuster from the luminance signal components.

4. The video signal processing apparatus of claim 3, wherein
   the horizontal filter is a band-pass filter having a pass-band of 3.58 MHz, and the time filter is a high-pass filter having a pass-band of 15 Hz.

5. A video signal processing apparatus comprising:
   a filter operable to receive luminance signal components of a component video signal, and operable to filter the luminance signal components of the component video signal in a horizontal direction and in a temporal direction;
   a comparator operable to decide whether an output of the filter is equal to or larger than a predetermined threshold;
   a gain adjuster operable to receive the output of the filter, operable to change a gain of the output of the filter according to a result of the comparator, and operable to output an obtained result; and
   a subtracter operable to subtract an output of the gain adjuster from the luminance signal components.

6. The video signal processing apparatus of claim 5, wherein the filter is a filter having a horizontal pass-band of 3.58 MHz and a temporal pass-band of 15 Hz.

7. A video signal processing method comprising:
   extracting a first frequency component from luminance signal components of a component video signal;
   obtaining a difference value of the luminance signal components between a present frame and an immediately preceding frame;
   obtaining a difference value of color-difference signal components of the component video signal between the present frame and the immediately preceding frame; and
   subtracting one-half of the difference value of the color-difference signal components between the present frame and the immediately preceding frame from the color-difference signal components, or replacing the color-difference signal components with an average value of the present frame and the immediately preceding frame, when the first frequency component value of the luminance signal components is equal to or larger than a first predetermined value, the difference value of the luminance signal components between the present frame and the immediately preceding frame is equal to or smaller than a second predetermined value, and an absolute value of the difference value of the color-difference signal components between the present frame and the immediately preceding frame is equal to or larger than a third predetermined value.

8. The video signal processing method of claim 7, wherein the first frequency component is extracted by filtering the luminance signal components with a horizontal band-pass filter having a pass band of 3.58 MHz.

9. A video signal processing method comprising:
extracting a first frequency component from luminance signal components of a component video signal;
obtaining a difference value of the luminance signal components between a present frame and an immediately preceding frame;
obtaining a difference value of color-difference signal components of the component video signal between the present frame and the immediately preceding frame;
obtaining a difference value of the color-difference signal components between the present frame and a frame that is two frames before; and
subtracting one-half of the difference value of the color-difference signal components between the present frame and the immediately preceding frame from the color-difference signal components, or replacing the color-difference signal components with an average value of the present frame and the immediately preceding frame, when the first frequency component value of the luminance signal components is equal to or larger than a first predetermined value, an absolute value of the difference value of the luminance signal components between the present frame and the immediately preceding frame is equal to or smaller than a second predetermined value, an absolute value of the difference value of the color-difference signal components between the present frame and the immediately preceding frame is equal to or larger than a third predetermined value, and an absolute value of the difference value of the color-difference signal components between the present frame and a frame that is two frames before is equal to or smaller than a fourth predetermined value.

10. The video signal processing method of claim 9, wherein
the first frequency component is extracted by filtering the luminance signal components with a horizontal band-pass filter having a pass band of 3.58 MHz.

11. A video signal processing apparatus comprising:
a filter operable to receive luminance signal components of a component video signal, and operable to extract a first predetermined frequency component;
a first frame memory operable to store the luminance signal components for one frame period;
a first subtracter operable to obtain a difference value between the luminance signal components and an output of the first frame memory;
a second frame memory operable to store color-difference signal components of the component video signal for one frame period;
a second subtracter operable to obtain a difference value between the color-difference signal components and an output of the second frame memory;
a noise detector operable to receive an output of the filter, an output of the first subtracter and an output of the second subtracter, and operable to detect noises;
a gain adjuster operable to receive the output of the second subtracter, and operable to change a gain of the output of the second subtracter according to a result of the detection by the noise detector; and
a third subtracter operable to subtract an output of the gain adjuster from the color-difference signal components.

12. The video signal processing apparatus of claim 11, wherein
the filter is a horizontal band-pass filter having a pass-band of 3.58 MHz, and
the noise detector decides that noises are detected, when an absolute value of the output of the filter is equal to or larger than a first predetermined value, an absolute value of the output of the first subtracter is equal to or smaller than a second predetermined value, and an absolute value of the output of the second subtracter is equal to or larger than a third predetermined value.

13. The video signal processing apparatus of claim 11, wherein
the gain adjuster changes the gain of the output of the second subtracter to one-half when noises are detected by the noise detector, and changes the gain to 0 when no noise is detected by the noise detector.

14. A video signal processing method by which dot crawls and time-axis noises are eliminated from luminance signal components of a component video signal, the method comprising:
extracting a first predetermined frequency component from the luminance signal components in a three-dimensional frequency space;
eliminating a second predetermined frequency component from the luminance signal components according to a size of the first predetermined frequency component when elimination of the dot crawls is designated; and
eliminating minute-level components varying in a temporal direction when elimination of the time-axis noises is designated.

15. The video signal processing method of claim 14, wherein
the first predetermined frequency component is extracted by filtering the luminance signal components in a horizontal direction with a filter having a pass-band of 3.58 MHz, and further filtering the luminance signal components in a temporal direction with a filter having a pass-band of 15 Hz.

16. A video signal processing method by which cross color interferences and time-axis noises are eliminated from color-difference signal components of a component video signal, the method comprising:
eliminating minute-level components varying in a temporal direction of the color-difference signal components when elimination of the time-axis noises is designated;
obtaining a difference value of the color-difference signal components between a present frame and an immediately preceding frame when elimination of the cross color interferences is designated;
extracting a predetermined frequency component of luminance signal components of the component video signal;

obtaining a difference value of the luminance signal components between the present frame and the immediately preceding frame;

deciding that the cross color interferences are occurring when an absolute value of the difference value of the color-difference signal components between the present frame and the immediately preceding frame is equal to or larger than a first predetermined value, an absolute value of the predetermined frequency component of the luminance signal components is equal to or larger than a second predetermined value, and an absolute value of the difference value of the luminance signal components between the present frame and the immediately preceding frame is equal to or smaller than a third predetermined value; and subtracting one-half of the difference value of the color-difference signal components between the present frame and the immediately preceding frame from the color-difference signal components, or replacing the color-difference signal components with an average value of the present frame and the immediately preceding frame, when it is decided that the cross color interferences are occurring.

17. The video signal processing method of claim 16, wherein the predetermined frequency component of the luminance signal components is extracted by filtering the luminance signal components with a horizontal band-pass filter having a pass-band of 3.58 MHz.

18. A video signal processing apparatus comprising:

a first subtracter operable to subtract a first output of a noise detector from luminance signal components of a component video signal;

a first frame memory operable to store an output of the first subtracter for one frame period;

a second subtracter operable to subtract an output of the first frame memory from the luminance signal components;

a first filter operable to extract a predetermined frequency component from the output of the first subtracter;

a second filter operable to extract a predetermined frequency component from an output of the second subtracter;

a third subtracter operable to subtract a second output of the noise detector from color-difference signal components of the component video signal;

a second frame memory operable to store an output of the third subtracter for one frame period;

a fourth subtracter operable to subtract an output of the second frame memory from the color-difference signal components;

a designation input mechanism operable to input designation regarding which noises among dot crawls, cross color interferences and time-axis noises are to be eliminated, from outside;

wherein the noise detector is operable to receive the respective outputs of the first filter, the second filter, the second subtracter and the fourth subtracter, and the designation inputted by the designation input mechanism as to which noises among dot crawls, cross color interferences and time-axis noises are to be eliminated, operable to decide a third output on the basis of the respective outputs of the second filter and the first filter when elimination of the dot crawls is designated, operable to decide a second output on the basis of the respective outputs of the first filter, the second subtracter and the fourth subtracter when elimination of the cross color interferences is designated, and operable to decide a first output on the basis of the output of the second subtracter and a second output on the basis of the output of the fourth subtracter when elimination of the time-axis noises is designated; and wherein a fifth subtracter is operable to subtract the third output of the noise detector from the output of the first subtracter.

* * * * *